United States Patent
Miyazaki

(10) Patent No.: US 9,012,541 B2
(45) Date of Patent: Apr. 21, 2015

(54) RUBBER COMPOSITION AND PNEUMATIC TIRE

(71) Applicant: Sumitomo Rubber Industries, Ltd., Kobe-shi, Hyogo (JP)

(72) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/013,286

(22) Filed: Aug. 29, 2013

(65) Prior Publication Data
US 2014/0066548 A1    Mar. 6, 2014

(30) Foreign Application Priority Data

Sep. 3, 2012   (JP) ................................ 2012-193408

(51) Int. Cl.
| | |
|---|---|
| *C08L 9/08* | (2006.01) |
| *C08L 7/02* | (2006.01) |
| *B60C 1/00* | (2006.01) |
| *C08L 1/28* | (2006.01) |
| *C08L 97/02* | (2006.01) |

(52) U.S. Cl.
CPC ... *C08L 9/08* (2013.01); *B60C 1/00* (2013.01); *C08L 7/02* (2013.01); *B60C 2001/005* (2013.04); *C08L 1/288* (2013.01); *C08L 97/02* (2013.01)

(58) Field of Classification Search
None
See application file for complete search history.

(56) References Cited

U.S. PATENT DOCUMENTS

| | | |
|---|---|---|
| 2,140,527 A | 12/1938 | Haynes et al. |
| 2,486,720 A | 11/1949 | Perkerson |
| 2,650,891 A | 9/1953 | Buckwalter |
| 3,709,845 A | 1/1973 | Boustany et al. |
| 3,959,194 A | 5/1976 | Adelmann |
| 4,508,860 A | 4/1985 | Hawes |
| 5,290,830 A | 3/1994 | Tung et al. |
| 6,117,545 A | 9/2000 | Cavaille et al. |
| 6,703,497 B1 | 3/2004 | Ladouce et al. |
| 8,022,136 B2 | 9/2011 | Yano et al. |
| 2003/0083516 A1 | 5/2003 | Korth et al. |
| 2007/0197688 A1 | 8/2007 | Tsukada et al. |

(Continued)

FOREIGN PATENT DOCUMENTS

| | | |
|---|---|---|
| CN | 101270219 A | 9/2008 |
| CZ | 237729 B1 | 10/1985 |

(Continued)

OTHER PUBLICATIONS

"Shinpan Kobunshi Jiten" (Polymer Dictionary, New Edition), 6th Imp., published Mar. 20, 2001, p. 448, with partial translation of lines 21-30 of the left column of p. 448 (3 pages total).

(Continued)

*Primary Examiner* — Vu A Nguyen
(74) *Attorney, Agent, or Firm* — Birch, Stewart, Kolasch & Birch, LLP

(57) ABSTRACT

The present invention provides a rubber composition that allows uniform dispersion of microfibrillated plant fibers so as to improve the required performance for a tire in a balanced manner, and a pneumatic tire formed from the rubber composition. The present invention relates to a rubber composition prepared from a masterbatch obtained by mixing rubber latex, microfibrillated plant fibers and a cationic polymer, wherein 0.01 to 5 parts by mass of the cationic polymer is added per 100 parts by mass of a rubber component of the rubber latex.

8 Claims, 2 Drawing Sheets

(56) References Cited

U.S. PATENT DOCUMENTS

| | | |
|---|---|---|
| 2007/0241480 A1 | 10/2007 | Kanenari et al. |
| 2009/0099281 A1 | 4/2009 | Sakurai et al. |
| 2010/0076118 A1* | 3/2010 | Yano et al. .......... 523/351 |
| 2010/0294407 A1 | 11/2010 | Kushida |
| 2011/0094648 A1 | 4/2011 | Horiguchi |
| 2011/0230613 A1 | 9/2011 | Hiro |
| 2011/0253285 A1 | 10/2011 | Ichikawa et al. |
| 2013/0066021 A1* | 3/2013 | Ichikawa et al. .......... 525/333.1 |

FOREIGN PATENT DOCUMENTS

| | | |
|---|---|---|
| EP | 0328261 A1 | 8/1989 |
| EP | 0905186 A1 | 3/1999 |
| EP | 1650253 A1 | 4/2006 |
| EP | 2072574 A1 | 6/2009 |
| EP | 2223928 A1 | 9/2010 |
| EP | 2284022 A1 | 2/2011 |
| EP | 2333008 A1 | 6/2011 |
| EP | 2615127 A2 | 7/2013 |
| GB | 164392 A | 6/1921 |
| GB | 240939 A | 10/1925 |
| JP | 5-301994 A | 11/1993 |
| JP | 6-87306 A | 3/1994 |
| JP | 11-78437 A | 3/1999 |
| JP | 11-129711 A | 5/1999 |
| JP | 11-222012 A | 8/1999 |
| JP | 11-513425 A | 11/1999 |
| JP | 2000-95898 A | 4/2000 |
| JP | 2002-503621 A | 2/2002 |
| JP | 2002-155164 A | 5/2002 |
| JP | 2002-524618 A | 8/2002 |
| JP | 2003-64221 A | 3/2003 |
| JP | 2003-320804 A | 11/2003 |
| JP | 2005-68240 A | 3/2005 |
| JP | 2005-75856 A | 3/2005 |
| JP | 2005-133025 A | 5/2005 |
| JP | 2005-325307 A | 11/2005 |
| JP | 2006-36926 A | 2/2006 |
| JP | 2006-9692 A | 4/2006 |
| JP | 2006-206837 A | 8/2006 |
| JP | 2006-206864 A | 8/2006 |
| JP | 2006-281744 A | 10/2006 |
| JP | 2008-308615 A | 12/2008 |
| JP | 2009-67929 A | 4/2009 |
| JP | 2009-84564 A | 4/2009 |
| JP | 2009-108308 A | 5/2009 |
| JP | 2009-191198 A | 8/2009 |
| JP | 2009-202865 A | 9/2009 |
| JP | 2010-70747 A | 4/2010 |
| JP | 2010-111785 A | 5/2010 |
| JP | 2010-144001 A | 7/2010 |
| JP | 2010-173513 A | 8/2010 |
| JP | 2010-242023 A | 10/2010 |
| JP | 2010-248282 A | 11/2010 |
| JP | 4581116 B2 | 11/2010 |
| JP | 2010-275642 A | 12/2010 |
| JP | 2011-63651 A | 3/2011 |
| JP | 2011-153222 A | 8/2011 |
| JP | 2011-157473 A | 8/2011 |
| JP | 2011-231214 A | 11/2011 |
| JP | 2011-256311 A | 12/2011 |
| JP | 2012-1571 A | 1/2012 |
| WO | 2005/092971 A1 | 10/2005 |
| WO | WO 2009/096113 A1 | 8/2009 |
| WO | WO 2011/096399 A1 | 8/2011 |

OTHER PUBLICATIONS

Extended European Search Report, dated Aug. 27, 2010, for European Application No. 08830800.2.
The Chemical Society of Japan, "Hyojun Kagaku Yogo Jiten" (Standard Dictionary of Chemical Terms), 2nd Ed., published Mar. 31, 2005, pp. 672-673, with partial translation of lines 5-9 of the left column of p. 673 (3 pages total).
Tokai Carbon Co., Ltd., "Seast So (FEF)", Physicochemical Properties, Product Information, retrieved Feb. 20, 2014, 3 pages, http://www.tokaicarbon.co.jp/en/products/carbon_b/seast/.
Food Chemicals Codex (7th Edition), Monographs/Calcium Lignosulfonate, First Published: Prior to FCC 6, Last Revision: First Supplement, FCC 6, 2010, p. 142.
United States Office Action, issued Sep. 18, 2014, for U.S. Appl. No. 13/752,711.
U.S. Office Action, dated Feb. 23, 2015, issued in U.S. Appl. No. 13/752,711.

* cited by examiner

RUBBER COMPOSITION AND PNEUMATIC TIRE

TECHNICAL FIELD

The present invention relates to a rubber composition and a pneumatic tire formed from the rubber composition.

BACKGROUND ART

Microfibrillated plant fibers such as cellulose fibers can be incorporated as filler in a rubber composition to reinforce the rubber composition and enhance the modulus (complex modulus). However, microfibrillated plant fibers have strong self-aggregation properties and poor compatibility with the rubber component. For this reason, for example, when microfibrillated plant fibers are added to rubber latex and then mixed, unfortunately approximately 20% of the added microfibrillated plant fibers cannot be incorporated into the rubber component and still remain in the solution.

In the case where rubber latex is mixed with microfibrillated plant fibers to prepare a masterbatch, agglomerates of the microfibrillated plant fibers are likely to be formed in the masterbatch. For this reason, if this masterbatch is used for a tire, the formed agglomerates may cause premature wear, cracks, chipping, and interlayer separation. Further, the agglomerates may even cause leakage of air and loss of handling stability.

As mentioned above, there is room for improvement in that, though improving the modulus, the addition of microfibrillated plant fibers may reduce the required performance for a tire, that is, handling stability, abrasion resistance, and durability, and therefore eliminate the functional merit of the tire.

Patent Literature 1 discloses a method for improving the compatibility between the rubber component and microfibrillated plant fibers by a chemical modification of the microfibrillated plant fibers. However, this method is also not sufficient for overall improvement in the above performance properties.

CITATION LIST

Patent Literature

Patent Literature 1: JP Patent No. 4581116

SUMMARY OF INVENTION

Technical Problem

An object of the present invention is to solve the problems, and provide a rubber composition that allows uniform dispersion of microfibrillated plant fibers so as to improve the required performance for a tire in a balanced manner, and a pneumatic tire formed from the rubber composition.

Solution to Problem

The present invention relates to a rubber composition, prepared from a masterbatch obtained by mixing rubber latex, microfibrillated plant fibers and a cationic polymer, wherein 0.01 to 5 parts by mass of the cationic polymer is added per 100 parts by mass of a rubber component of the rubber latex.

The rubber composition preferably contains at least one diene rubber selected from the group including natural rubber, isoprene rubber, epoxidized natural rubber, butadiene rubber, and styrene butadiene rubber.

The rubber composition preferably contains 0.1 to 20 parts by mass of the microfibrillated plant fibers per 100 parts by mass of the total rubber component of the rubber composition.

The masterbatch preferably contains 5 to 30 parts by mass of the microfibrillated plant fibers per 100 parts by mass of a rubber component of the rubber latex.

The rubber composition is preferably for use in a sidewall, an inner sidewall layer, a breaker cushion, a base tread, a tie gum, a bead apex, or a strip apex.

The rubber composition preferably has a ratio ($E^*a/E^*b$) of a complex modulus $E^*a$ in an extrusion direction to a complex modulus $E^*b$ in a direction perpendicular to the extrusion direction, measured at a temperature of 70° C. and a dynamic strain of 2%, of 1.05 to 6.00, with the $E^*a$ being 7 to 100 MPa.

The rubber composition is preferably for use in a tread.

The present invention also relates to a pneumatic tire, formed from the rubber composition.

Advantageous Effects of Invention

According to the present invention, the rubber composition is prepared from a masterbatch obtained by mixing rubber latex, microfibrillated plant fibers and a predetermined amount of a cationic polymer. Use of the rubber composition in a tire component such as sidewalls leads to the formation of a pneumatic tire whose performance properties such as handling stability and riding comfort have been improved in a balanced manner.

DESCRIPTION OF EMBODIMENTS

Figure 1:
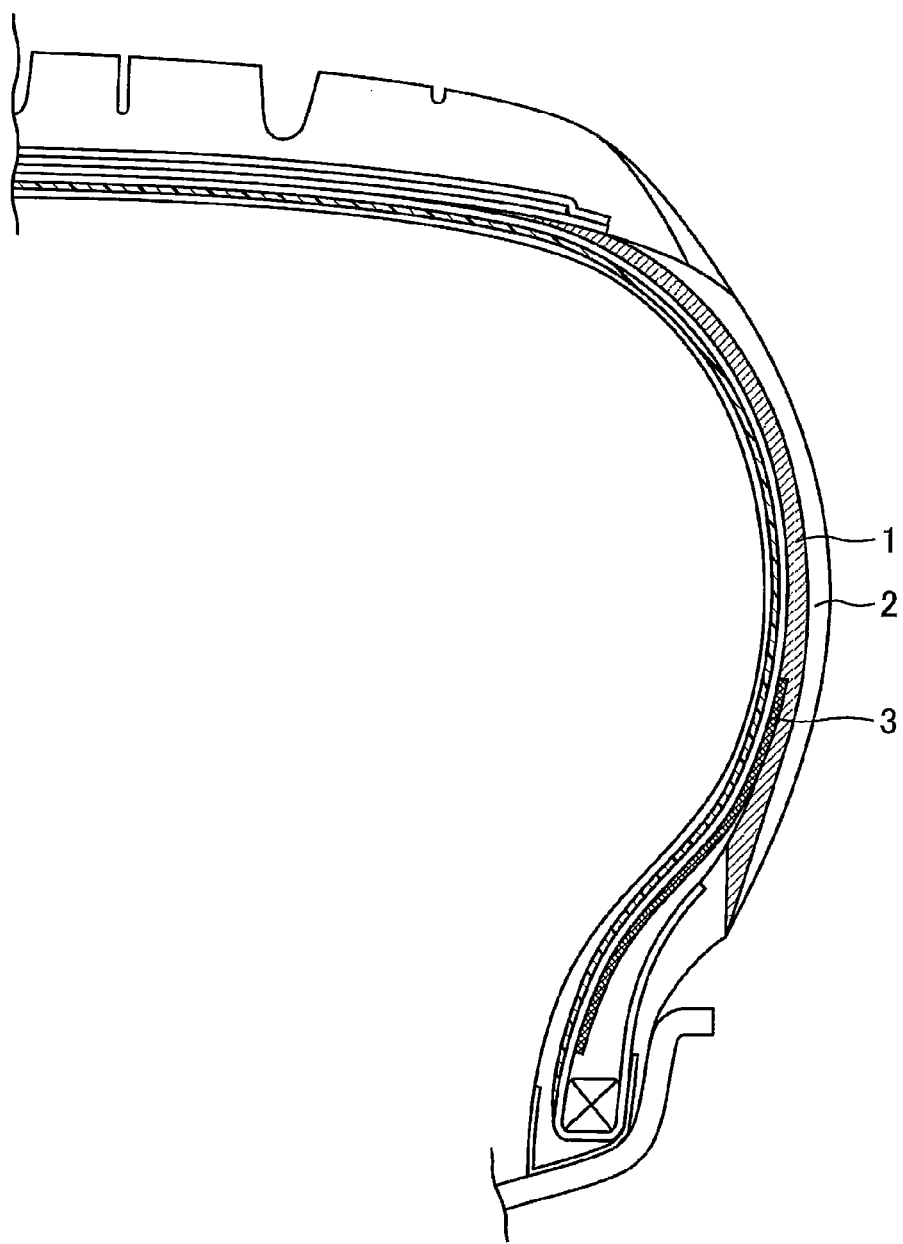
FIG. 1 is a schematic view of a cross section of each test tire in Examples and Comparative Examples. A sidewall in the test tire has a two-layer structure.

The rubber composition according to the present invention is prepared from a masterbatch obtained by mixing rubber latex, microfibrillated plant fibers and a predetermined amount of a cationic polymer.

In order to improve the performance of a tire by adding microfibrillated plant fibers, the microfibrillated plant fibers need to be uniformly incorporated into the rubber component of the masterbatch, and also need to be quickly dispersed into another rubber component when the masterbatch is kneaded with the other rubber component. The conventional methods, however, are difficult to meet these requirements.

In contrast, in the present invention, a masterbatch obtained by mixing rubber latex, microfibrillated plant fibers and a cationic polymer as a flocculant can be kneaded with another rubber component and the like to prepare a rubber composition in which the microfibrillated plant fibers are uniformly dispersed.

When the rubber composition is used in a tire component, a pneumatic tire can be obtained whose properties such as handling stability and riding comfort have been improved in a balanced manner. In addition, then agglomerates of microfibrillated plant fibers can be reduced to obtain good abrasion resistance and processability. Furthermore, it is also possible to thin the sidewall and bead portions while maintaining such good handling stability, thereby enabling vehicles to have improved fuel economy.

The rubber latex is not particularly limited and examples include natural rubber latex, styrene butadiene rubber latex (SBR latex), and butadiene rubber latex (BR latex). Among these, natural rubber latex and SBR latex are preferred, and natural rubber latex is more preferred.

Natural rubber latex is collected as a sap of natural rubber trees such as Hevea trees, and it contains a rubber component as well as water, proteins, lipids, inorganic salts, and the like. It is thought that a gel fraction in rubber is derived from a complex of a variety of impurities. In the present invention, usable natural rubber latexes include raw latex (field latex) taken from Hevea trees by tapping the trees, concentrated latex obtained by centrifugation or creaming (e.g., purified latex, high ammonia latex containing ammonia added by a usual method, and LATZ latex stabilized with zinc oxide, TMTD and ammonia), and the like.

Natural rubber latex has honeycomb cells formed from proteins and phospholipids, and the cells tend to inhibit incorporation of the microfibrillated plant fibers into the natural rubber. For this reason, when natural rubber latex is mixed with microfibrillated plant fibers, conventionally a preliminary treatment needs to be performed, such as saponification treatment to remove the cells in the natural rubber latex. In the present invention, the use of a cationic polymer as a flocculant allows the preparation of a rubber composition in which microfibrillated plant fibers are uniformly dispersed, even when natural rubber latex that has not been saponified is used.

The concentration of the rubber component (rubber solids) in the rubber latex is not particularly limited. The concentration is preferably 10 to 80% by mass, and more preferably 20 to 60% by mass.

Examples of the microfibrillated plant fibers (cellulose nanofibers) include those derived from natural products such as wood, bamboo, hemp, jute, kenaf, crop wastes, cloths, recycled pulp, wastepaper, bacterial cellulose, and ascidian cellulose. The method for preparing the microfibrillated plant fibers is not particularly limited, and for example, a method may be mentioned in which any of the above natural products is chemically treated with a chemical such as sodium hydroxide and then mechanically ground or beaten by a machine such as a refiner, a twin-screw kneader (twin-screw extruder), a twin-screw kneading extruder, a high-pressure homogenizer, a media agitating mill, a stone mill, a grinder, a vibrating mill, or a sand grinder.

The masterbatch preferably contains 5 parts by mass or more, more preferably 10 parts by mass or more, of microfibrillated plant fibers per 100 parts by mass of the rubber component of the rubber latex. At a content of less than 5 parts by mass, too much rubber may be incorporated in the rubber composition containing the masterbatch in order to secure a desired amount of microfibrillated plant fibers in the rubber composition. In this case, the crosslink density may be reduced and the fuel economy may be poor. Moreover, a sufficient amount of microfibrillated plant fibers to improve the performance may not be provided with the rubber composition. The content of microfibrillated plant fibers is preferably 30 parts by mass or less, and more preferably 26 parts by mass or less, per 100 parts by mass of the rubber component of the rubber latex. At a content of more than 30 parts by mass, the masterbatch may become too hard compared with other rubber materials such as TSR, BR and SBR, and therefore the masterbatch may not be easily mixed with the other rubber materials. In turn, the dispersibility of microfibrillated plant fibers may be reduced, leading to poor elongation at break and poor fuel economy.

The masterbatch can be prepared by, for example, a method including a step (I) of mixing rubber latex and microfibrillated plant fibers and coagulating the resulting mixture, and a step (II) of washing a coagulum obtained in the step (I). In the step (I), a cationic polymer is added as a flocculant, that is, a coagulant aid before or after the coagulation of the mixture.

(Step (I))

In the step (I), microfibrillated plant fibers may be introduced into rubber latex, in the form of an aqueous solution of the microfibrillated plant fibers dispersed in water (microfibrillated plant fiber aqueous solution). Or alternatively, microfibrillated plant fibers may be introduced as it is into rubber latex, and then optionally diluted with water. Preferably, the microfibrillated plant fiber aqueous solution is introduced into rubber latex because microfibrillated plant fibers can be dispersed well. The content of microfibrillated plant fibers (solids content) in the microfibrillated plant fiber aqueous solution is preferably 0.2 to 20% by mass, and more preferably 0.5 to 10% by mass.

The degree of disintegration (degree of cutting) of microfibrillated plant fibers can be determined from the viscosity of the microfibrillated plant fiber aqueous solution. In other words, the higher the viscosity is, the more the fibers are disintegrated (which means that the fibers are cut into shorter lengths). The viscosity of the microfibrillated plant fiber aqueous solution is preferably 1.5 mPa·s or more, more preferably 2.0 mPa·s or more, still more preferably 2.5 mPa·s or more, and particularly preferably 5.0 mPa·s or more. At a viscosity of less than 1.5 mPa·s, the fibers may not be sufficiently disintegrated for satisfactory reinforcement. In addition, fiber agglomerates may form fracture nuclei to reduce elongation at break. The viscosity of the microfibrillated plant fiber aqueous solution is preferably 30.0 mPa·s or less, more preferably 25.0 mPa·s or less, still more preferably 20.0 mPa·s or less, and particularly preferably 10.0 mPa·s or less. At a viscosity of more than 30.0 mPa·s, the aqueous solution may be difficult to stir and therefore the fibers around a stirring rotor may be locally milled, so that the fibers are less likely to be uniformly milled. In addition, the aqueous solution may be difficult to knead with rubber latex.

Here, the viscosity of the microfibrillated plant fiber aqueous solution is a value obtained by measuring the microfibrillated plant fiber aqueous solution containing 0.5% by mass of microfibrillated plant fibers and 99.5% by mass of water with a tuning fork vibration viscometer at ordinary temperature (23° C.).

The degree of disintegration of microfibrillated plant fibers can be adjusted by the stirring rate, stirring time, and the like for the microfibrillated plant fiber aqueous solution. The fibers can be more disintegrated by stirring at a higher stirring rate for a longer stirring time. The fibers can be disintegrated efficiently by appropriate selection of the type of homogenizer to be used for stirring, the shape of rotary teeth, and the shear performance. In the early stage of stirring, the fibers are roughly milled using rotary teeth spaced at wide interval, and then these rotary teeth are replaced by rotary teeth spaced at narrow intervals, whereby fibers having a proper size (approximately 100 nm to 100 μm) can be obtained in a short time.

A mixture of rubber latex and microfibrillated plant fibers can be prepared by sequentially adding dropwise or injecting these materials, and mixing them by a known method.

In the step (I), preferably, a predetermined amount of a cationic polymer as a flocculant (coagulant aid) is added, and then an antioxidant is further added and mixed. In this case, it is possible to inhibit degradation due to oxidation, ozone, and ultraviolet light. Moreover, when the mixture of rubber latex and microfibrillated plant fibers is coagulated, it is preferable to form a coagulum (crumb) of a proper size (approximately 0.1 to 5 mm). The size of the coagulum is an important factor in the handleability and washing efficiency of the coagulum. At a size of the coagulum of less than 0.1 mm, for example, it may be necessary to reduce the mesh size of a filtering material to prevent the microfibrillated plant fibers from leaking into the serum during filtration, or to use a suction device or a centrifuge because the coagula come together poorly. In this way, the handleability tends to be deteriorated. At a size of the coagulum of more than 10 mm, impurities inside the coagulum are unlikely to be easily removed, and therefore the washing efficiency tends to be deteriorated.

Examples of the cationic polymer include polymethacrylate polymers and polyacrylate polymers. Polymethacrylate polymers are preferred. Examples of the polymethacrylate polymers include cationized celluloses such as POIZ series made by Kao Corporation (O-[2-hydroxy-3-(trimethylammonio)propyl]hydroxycellulose chloride) and C-303H made by MT AquaPolymer, Inc. Cationized celluloses can be suitably used.

The amount of the cationic polymer to be added is 0.01 parts by mass or more, preferably 0.1 parts by mass or more, whereas it is 5 parts by mass or less, preferably 3 parts by mass or less, per 100 parts by mass of the rubber component of the rubber latex. At an amount of less than 0.01 parts by mass, the effect of the added cationic polymer tends not to be satisfactory. An amount of more than 5 parts by mass tends to cause slipping between the rubber component and the microfibrillated plant fibers, leading to reduced complex modulus $E^*$ and reduced elongation at break.

The antioxidant to be added is preferably a cresol antioxidant such as a t-butylated condensation product of p-cresol and dicyclopentadiene, and dibutylhydroxytoluene, and is more preferably a t-butylated condensation product of p-cresol and dicyclopentadiene. Presumably because of their high polarity, 6PPD (N-phenyl-N'-(1,3-dimethylbutyl)-p-phenylenediamine) and TMQ (2,2,4-trimethyl-1,2-dihydroquinoline polymer), which are generally used in tire compounds, are less likely to be incorporated into rubber latex and thus tend to remain in the solution.

The amount of the antioxidant to be added is not particularly limited. The amount may be approximately 0.1 to 10 parts by mass per 100 parts by mass of the rubber component of the rubber latex.

Examples of the method for coagulating the mixture include acid coagulation, salt coagulation, and methanol coagulation. In order to coagulate the mixture so that the microfibrillated plant fibers are uniformly dispersed in the masterbatch, acid coagulation, salt coagulation, or a combination thereof is preferred, and acid coagulation is more preferred. Examples of acids for the coagulation include formic acid, sulfuric acid, hydrochloric acid, and acetic acid. From the viewpoint of cost, sulfuric acid is preferred. Examples of salts for the coagulation include monovalent to trivalent metal salts (e.g. sodium chloride, magnesium chloride, calcium salts such as calcium nitrate and calcium chloride). Preferably, the mixture is coagulated by adding an acid or salt to adjust the pH of the mixture to 3 to 8 (preferably 4 to 7, more preferably 5 to 6) so that the solids are coagulated.

If the mixture is coagulated rapidly, the microfibrillated plant fibers tend to be incorporated into the rubber latex, in the form of agglomerates like "fuzz balls," and therefore the microfibrillated plant fibers tend not to be dispersed easily. Hence, the mixture is preferably coagulated in conditions such that the microfibrillated plant fibers are slowly incorporated into the rubber latex. From such a viewpoint, the temperature of the mixture during coagulation is preferably 40° C. or less, and more preferably 35° C. or less. From the same viewpoint, a coagulating agent such as an acid, salt, or methanol as described above is preferably introduced in steps (or in divided portions).

(Step (II))

In the step (II), the coagulum (agglomerated product containing the agglomerated rubber and the microfibrillated plant fibers) obtained in the step (I) is washed.

Examples of the washing method include a method of diluting the rubber component with water and then performing centrifugation, and a method of diluting the rubber component with water, leaving the dilution at rest to allow the rubber to float or sediment, and then only removing the aqueous phase. In the centrifugation method, dilution with water may first be performed so that the rubber component of the rubber latex accounts for 5 to 40% by mass, preferably 10 to 30% by mass, and then the diluted rubber may be centrifuged at 5,000 to 10,000 rpm for 1 to 60 minutes. Also in the method of leaving the dilution at rest to allow the rubber to float or sediment, the washing method may be carried out by repeating addition of water and stirring of the dilution.

The washing method is not limited to these methods. Washing may be performed by further removing phosphorus and nitrogen fractions remaining in the rubber with weak alkaline water (e.g. sodium hydrogen carbonate) such that the pH falls within the range of 4 to 6, followed by washing with water. When necessary, the coagulum after washing may be squeezed with a roll squeezer or the like, and may further be washed. The addition of the step of squeezing the coagulum allows a uniform pH at the surface and the inside of the coagulum.

In the step (I), the size of the coagulum (crumb) can be reduced to approximately 0.1 to 1 mm by properly adjusting the conditions for milling (or homogenizing) the microfibrillated plant fibers and the conditions for coagulating the mixture. When the coagulum is of such a size, most of nitrogen and phosphorus in the coagulum can be removed by discharging the filtrate after washing, and then lightly squeezing the coagulum, without repeating washing. In the case of using natural rubber latex, washing only once by this method enables approximately 80% of nitrogen and phosphorus to be removed without saponification treatment.

The coagulum after washing is usually dried by a known method (e.g. oven or vacuum). In the present examples described later, the coagulum was dried in vacuum at 40° C. for 12 hours.

In the case where the pH of the coagulum is greatly different from the pH of another rubber component, use of them in combination may lead to variation in the curing rate and the physical properties. Since the pH of TSR used in typical tire compounds is 5.5, the coagulum after drying preferably has a pH of 4 to 6.

The pH of the coagulum after drying can be measured by dropping water onto the coagulum, kneading it, and measuring the pH with a pH meter.

The coagulum after drying is subjected to rubber kneading with a twin screw roll mill, a Banbury mixer or the like to give a masterbatch crumb containing rubber and microfibrillated plant fibers. The masterbatch is preferably formed into a sheet having a thickness of a few centimeters with a rolling mill so as to have improved cohesive properties and handleability. The masterbatch may contain other components as long as the effects of the present invention are not inhibited.

The microfibrillated plant fibers are oriented in an extrusion direction (corresponding to the circumferential direction of the tire, namely, the rotation direction in a tire component such as a tread, base tread, sidewall, clinch, tie gum, or bead apex). Thus, the microfibrillated plant fibers mainly reinforce the tire component in the extrusion direction, but make a small contribution to reinforcement in a direction perpendicular to the extrusion direction (in the radial direction of the tire). These characteristics can be taken advantage of to increase the complex modulus E* in the circumferential direction of the tire, which contributes to handling stability, while maintaining the complex modulus E* in the radial direction of the tire, which contributes to ride comfort. Therefore, handling stability and ride comfort can be both ensured. Meanwhile, if the complex modulus E* in the circumferential direction of the tire is increased by a conventional method, for example, by adding butadiene rubber containing syndiotactic crystals, the elongation at break tends to be greatly reduced. In contrast, when the complex modulus E* in the circumferential direction of the tire is increased according to the present invention, good elongation at break can be maintained. Because of these effects, the handling stability, ride comfort, and elongation at break can be improved in a balanced manner.

The rubber composition according to the present invention may contain another rubber component in addition to the rubber component of the masterbatch. The other rubber component preferably includes at least one diene rubber selected from the group consisting of natural rubber (NR), isoprene rubber (IR), epoxidized natural rubber (ENR), butadiene rubber (BR), and styrene butadiene rubber (SBR), more preferably NR, SBR or BR.

In the rubber composition according to the present invention, the content of NR is preferably 5% by mass or more, more preferably 15% by mass or more, and still more preferably 25% by mass or more, based on 100% by mass of the total rubber component (a total of the rubber component of the masterbatch and the other rubber component). At a content of less than 5% by mass, satisfactory elongation at break may not be obtained. Also, the content of NR is preferably 90% by mass or less, and more preferably 80% by mass or less. At a content of more than 90% by mass, the crack growth resistance and reversion resistance may be reduced.

In the rubber composition according to the present invention, the content of SBR is preferably 5% by mass or more, and more preferably 15% by mass or more, based on 100% by mass of the total rubber component. At a content of less than 5% by mass, the elongation at break, hardness, and reversion resistance may be reduced. Also, the content of SBR is preferably 60% by mass or less, and more preferably 30% by mass or less. At a content of more than 60% by mass, satisfactory fuel economy may not be obtained.

In the rubber composition according to the present invention, the content of BR is preferably 5% by mass or more, and more preferably 15% by mass or more, based on 100% by mass of the total rubber component. At a content of less than 5% by mass, the crack growth resistance and abrasion resistance may be reduced. The content of BR is preferably 60% by mass or less, and more preferably 40% by mass or less. At a content of more than 60% by mass, satisfactory fuel economy may not be obtained.

In the rubber composition according to the present invention, the content of microfibrillated plant fibers is preferably 0.1 parts by mass or more, more preferably 1 part by mass or more, still more preferably 2 parts by mass or more, and particularly preferably 3 parts by mass or more, per 100 parts by mass of the total rubber component. At a content of less than 0.1 parts by mass, the interaction of microfibrillated plant fibers is less likely to occur and therefore high complex modulus E* may not be obtained. The content of microfibrillated plant fibers is preferably 20 parts by mass or less, more preferably 15 parts by mass or less, and still more preferably 12 parts by mass or less, per 100 parts by mass of the total rubber component. At a content of more than 20 parts by mass, the microfibrillated plant fibers are less likely to disperse and therefore the elongation at break and fuel economy may be deteriorated.

The rubber composition according to the present invention preferably contains carbon black and/or silica. In this case, the tire can be properly reinforced in all the directions so that the hardness, crack growth resistance, and elongation at break can be improved in a balanced manner.

The carbon black preferably has a nitrogen adsorption specific surface area ($N_2SA$) of 25 $m^2/g$ or more, more preferably 80 $m^2/g$ or more. At an $N_2SA$ of less than 25 $m^2/g$, satisfactory elongation at break may not be obtained. The $N_2SA$ is preferably 200 $m^2/g$ or less, and more preferably 120 $m^2/g$ or less. At an $N_2SA$ of more than 200 $m^2/g$, satisfactory fuel economy may not be obtained.

The $N_2SA$ of carbon black herein is determined according to JIS K 6217-2:2001.

The silica preferably has a nitrogen adsorption specific surface area ($N_2SA$) of 70 $m^2/g$ or more, more preferably 80 $m^2/g$ or more. At an $N_2SA$ of less than 70 $m^2/g$, satisfactory elongation at break may not be obtained. The $N_2SA$ is preferably 300 $m^2/g$ or less, and more preferably 250 $m^2/g$ or less. At an $N_2SA$ of more than 300 $m^2/g$, satisfactory fuel economy may not be obtained.

The $N_2SA$ of silica herein is a value measured by the BET method according to ASTM D3037-93.

In the case where the rubber composition according to the present invention is used in a sidewall, an inner sidewall layer, a breaker cushion, a base tread, a tie gum, a bead apex, or a strip apex, the content of carbon black is preferably 10 parts by mass or more, and more preferably 30 parts by mass or more, whereas it is preferably 80 parts by mass or less, and more preferably 60 parts by mass or less, per 100 parts by mass of the total rubber component. At a content in the range, the handling stability, riding comfort, elongation at break, and compounding costs can be improved in a balanced manner.

In the case where the rubber composition according to the present invention is used in a tread, the content of carbon black is not particularly limited, and it is preferably 3 parts by mass or more, and more preferably 5 parts by mass or more, whereas it is preferably 120 parts by mass or less, and more preferably 110 parts by mass or less, per 100 parts by mass of the total rubber component.

In the case where the rubber composition according to the present invention is used in a sidewall, an inner sidewall layer, a breaker cushion, a base tread, a tie gum, a bead apex, or a strip apex, the content of silica is preferably 3 parts by mass or more, and more preferably 5 parts by mass or more, whereas it is preferably 20 parts by mass or less, and more preferably 15 parts by mass or less, per 100 parts by mass of the total rubber component. At a content in the range, the handling stability, riding comfort, and elongation at break can be improved in a balanced manner. In addition, the size is less likely to shrink after extrusion, resulting in good dimensional stability for extrusion.

In the case where the rubber composition according to the present invention is used in a tread, the content of silica is not particularly limited, and it is preferably 10 parts by mass or more, and more preferably 15 parts by mass or more, whereas it is preferably 120 parts by mass or less, and more preferably 110 parts by mass or less, per 100 parts by mass of the total rubber component.

The total content of carbon black and silica is preferably 25 parts by mass or more, and more preferably 35 parts by mass or more, per 100 parts by mass of the total rubber component. The total content is preferably 120 parts by mass or less, more preferably 110 parts by mass or less, and still more preferably 100 parts by mass or less. At a content in the range, the handling stability, riding comfort, and elongation at break can be improved in a balanced manner.

In the case where the rubber composition according to the present invention is used in a sidewall, an inner sidewall layer, a breaker cushion, a base tread, a tie gum, a bead apex, or a strip apex, the rubber composition preferably contains at least one crosslinking resin selected from the group consisting of a resorcinol resin (condensate), a modified resorcinol resin (condensate), a cresol resin, a modified cresol resin, a phenolic resin, and a modified phenolic resin. In this case, the complex moduli E* in all the directions of the tire can be enhanced while good elongation at break is maintained. The effect of enhancing the complex moduli E* in all the directions of the tire caused by the crosslinking resin can be exerted without impairing the effect of enhancing the complex modulus E* in the circumferential direction of the tire caused by the microfibrillated plant fibers. Hence, the complex modulus E* in the circumferential direction of the tire can be further increased by adding the crosslinking resin together with the microfibrillated plant fibers.

Examples of the resorcinol resin include resorcinol-formaldehyde condensates. Specific examples thereof include Resorcinols made by Sumitomo Chemical Co., Ltd. Examples of the modified resorcinol resin include resorcinol resins whose repeating units are partially alkylated. Specific examples thereof include Penacolite resins B-18-S and B-20 made by INDSPEC Chemical Corporation, SUMIKANOL 620 made by TAOKA Chemical Co., Ltd., R-6 made by Uniroyal, SRF1501 made by Schenectady Chemicals, and Arofene 7209 made by Ashland Inc.

Examples of the cresol resin include cresol-formaldehyde condensates. Examples of the modified cresol resin include cresol resins in which a terminal methyl group has been modified into a hydroxyl group, and cresol resins whose repeating units are partially alkylated. Specific examples thereof include SUMIKANOL 610 made by TAOKA Chemical Co., Ltd., and PR-X11061 made by Sumitomo Bakelite Co., Ltd. (a cresol resin synthesized from cresol monomers including o-cresol, m-cresol and p-cresol, in which the content of free cresol monomers remaining in the cresol resin (the content of free monomers) is as small as 0.6% by mass based on 100% by mass of the cresol resin).

Examples of the phenolic resin include phenol-formaldehyde condensates. Examples of the modified phenolic resin include phenolic resins modified with cashew oil, tall oil, flaxseed oil, a variety of animal and vegetable oils, unsaturated fatty acids, rosin, alkylbenzene resins, aniline, melamine, and the like.

The crosslinking resin is preferably a modified resorcinol resin or a modified phenolic resin, more preferably a modified phenolic resin, and still more preferably a cashew oil-modified phenolic resin, because then the handling stability, riding comfort, and elongation at break can be improved in a balanced manner.

In the case where the rubber composition according to the present invention is used in a sidewall, an inner sidewall layer, a breaker cushion, a base tread, a tie gum, a bead apex, or a strip apex, the total content of the crosslinking resins is preferably 1 part by mass or more, and more preferably 1.5 parts by mass or more, per 100 parts by mass of the total rubber component. At a total content of less than 1 part by mass, the effect of the added crosslinking resin(s) tends not to be satisfactory. The total content of the crosslinking resins is preferably 20 parts by mass or less, and more preferably 15 parts by mass or less, per 100 parts by mass of the total rubber component. At a total content of more than 20 parts by mass, the dispersibility of the crosslinking resin(s) tends to be reduced, thereby leading to reduction in fuel economy and elongation at break.

In the case where the rubber composition according to the present invention is used in a sidewall, an inner sidewall layer, a breaker cushion, a base tread, a tie gum, a bead apex, or a strip apex, the rubber composition preferably contains at least one methylene donor selected from the group consisting of a partial condensate of hexamethoxymethylmelamine (HMMM) and a partial condensate of hexamethylol melamine pentamethyl ether (HMMPME). In this case, the crosslinking resin(s) can be efficiently cured, thereby enhancing the effect of improving handling stability.

In the case where the rubber composition according to the present invention is used in a sidewall, an inner sidewall layer, a breaker cushion, a base tread, a tie gum, a bead apex, or a strip apex, the content of the methylene donor is preferably 0.5 parts by mass or more, and more preferably 1 part by mass or more, per 100 parts by mass of the total rubber component. At a content of less than 0.5 parts by mass, the amount of methylene fed may be so small that the handling stability may not be sufficiently improved. The content of the methylene donor is preferably 5 parts by mass or less, and more preferably 3 parts by mass or less, per 100 parts by mass of the total rubber component. At a content of more than 5' parts by mass, the elongation at break may be reduced.

In the case where the rubber composition according to the present invention is used in a sidewall, an inner sidewall layer, a breaker cushion, a base tread, a tie gum, a bead apex, or a strip apex, the rubber composition preferably contains an alkylphenol-sulfur chloride condensate represented by formula (1) shown below. In this case, a more thermally-stable crosslinked structure can be formed than in typical sulfur cross-linking, and therefore the handling stability and elongation at break can be greatly enhanced and at the same time good fuel economy can be obtained.

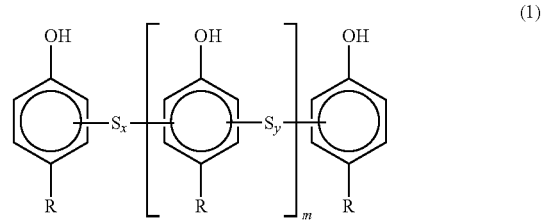

(1)

In the formula, Rs are the same as or different from one another and each represent an alkyl group having 5 to 15 carbon atoms or an amyl group; x and y are the same as or different from each other and each represent an integer of 1 to 4; and m represents an integer of 0 to 300.

In terms of good dispersibility of the alkylphenol-sulfur chloride condensate into the rubber component, m is an integer of 0 to 300, preferably an integer of 0 to 100, and more preferably an integer of 3 to 100. In terms of effective achievement of high hardness (suppression of reversion), x and y are each an integer of 1 to 4, and are preferably both 2. In terms of good dispersibility of the alkylphenol-sulfur chloride condensate into the rubber component, each R is an alkyl group having 5 to 15 carbon atoms or an amyl group, preferably an alkyl group having 8 to 15 carbon atoms.

The alkylphenol-sulfur chloride condensate can be prepared by a known method, and the method is not particularly limited. Examples of the method include a method of reacting an alkylphenol with sulfur chloride at a molar ratio of, for example, 1:0.9-1.25.

Examples of commercially available products of the alkylphenol-sulfur chloride condensate include TACKIROL V200 (in the formula (1), $R=C_8H_{17}$, x=2, y=2, m: an integer of 0 to 100) and TS3101 (in the formula (1), $R=C_{12}H_{25}$, x=2, y=2, m: an integer of 170 to 210) made by TAOKA Chemical Co., Ltd.

In the case where the rubber composition according to the present invention is used in a sidewall, an inner sidewall layer, a breaker cushion, a base tread, a tie gum, a bead apex, or a strip apex, the content of the alkylphenol-sulfur chloride condensate is preferably 0.2 parts by mass or more, and more preferably 1.5 parts by mass or more, per 100 parts by mass of the total rubber component. At a content of less than 0.2 parts by mass, the effect of improving hardness and tan δ caused by the alkylphenol-sulfur chloride condensate may not be sufficiently obtained. The content is preferably 10.0 parts by mass or less, more preferably 5.0 parts by mass or less, and still more preferably 3.0 parts by mass or less, per 100 parts by mass of the total rubber component. At a content of more than 10.0 parts by mass, the elongation at break may be reduced.

In the case where the rubber composition according to the present invention is used in a sidewall, an inner sidewall layer, a breaker cushion, a base tread, a tie gum, a bead apex, or a strip apex, the rubber composition preferably contains a C5 petroleum resin. In this case, good handling stability can be obtained. Examples of the C5 petroleum resin include aliphatic petroleum resins whose main raw material is an olefin or a diolefin in C5 fraction obtained by naphtha cracking.

The C5 petroleum resin preferably has a softening point of 50° C. or more, more preferably 80° C. or more. The softening point is preferably 150° C. or less, and more preferably 120° C. or less. At a softening point in the range, good adhesion and good elongation at break are obtained.

In the case where the rubber composition according to the present invention is used in a sidewall, an inner sidewall layer, a breaker cushion, a base tread, a tie gum, a bead apex, or a strip apex, the content of the C5 petroleum resin is preferably 0.5 parts by mass or more, and more preferably 1.5 parts by mass or more, per 100 parts by mass of the total rubber component. Also, the content is preferably 5 parts by mass or less, and more preferably 3 parts by mass or less. At a content in the range, good adhesion and good elongation at break are obtained.

In the case where the rubber composition according to the present invention is used in a tread, the rubber composition preferably contains an aromatic vinyl polymer. The aromatic vinyl polymer may suitably a copolymers of α-methylstyrene and styrene. The content of the aromatic vinyl polymer is preferably 1 to 20 parts by mass, and more preferably 5 to 15 parts by mass, per 100 parts by mass of the total rubber component.

The rubber composition according to the present invention may appropriately contain, in addition to the components mentioned above, compounding agents conventionally used in the rubber industry, such as oil, zinc oxide, stearic acid, a variety of antioxidants, sulfur, and vulcanization accelerators.

In the case where the rubber composition according to the present invention is used in a sidewall, an inner sidewall layer, a breaker cushion, a base tread, a tie gum, a bead apex, or a strip apex, the rubber composition preferably has a ratio ($E*a/E*b$) of a complex modulus $E*a$ in an extrusion direction (or in the circumferential direction of the tire) measured at a temperature of 70° C. and a dynamic strain of 2% to a complex modulus $E*b$ in a direction perpendicular to the extrusion direction (or in the radial direction of the tire) measured at a temperature of 70° C. and a dynamic strain of 2% of 1.05 to 6.00. By adjusting $E*a/E*b$ to fall within the range, the handling stability, riding comfort, and elongation at break can be obtained in a balanced manner. The ratio $E*a/E*b$ is more preferably 2.00 to 6.00, and still more preferably 3.00 to 6.00.

Herein, the circumferential direction of the tire and the radial direction of the tire refer specifically to the directions shown in, for example, FIG. 1 in JP 2009-202865 A, which is hereby incorporated by reference.

Herein, the complex moduli $E*a$ and $E*b$ are measured by the method described in the later-described Examples.

The ratio $E*a/E*b$ can be adjusted by the amount of microfibrillated plant fibers, the flexibility of microfibrillated plant fibers, the degree of disintegration of microfibrillated plant fibers, the extrusion pressure of the unvulcanized rubber composition, and the like.

More specifically, the ratio $E*a/E*b$ increases as the microfibrillated plant fibers are oriented in the circumferential direction of the tire at more even intervals, and as a larger amount of microfibrillated plant fibers are used.

The ratio $E*a/E*b$ can be increased by a conventional technique such as a method of using SPB (1,2-syndiotactic polybutadiene crystal)-containing BR such as VCR617 made by Ube Industries, Ltd., a method of increasing the amount of a crosslinking agent, a method of using a phenolic resin in combination with HMT, and a method of increasing the amount of carbon black; however, microfibrillated plant fibers have a greater effect in increasing the ratio $E*a/E*b$ than the conventional techniques do. Particularly, the conventional techniques have great difficulties adjusting $E*a/E*b$ to 3.00 or more without impairing elongation at break and durability; in contrast, the use of microfibrillated plant fibers enables this adjustment to be accomplished.

In the case where the rubber composition according to the present invention is used in a sidewall, an inner sidewall layer, a breaker cushion, a base tread, a tie gum, a bead apex, or a strip apex, the $E*a$ is preferably 7 to 100, and more preferably 30 to 100, because then good handling stability is obtained. The $E*b$ is preferably 3 to 20 because then good riding comfort is obtained.

The method for producing the rubber composition according to the present invention may be a known method. For example, the rubber composition can be prepared by a method in which the components mentioned above are kneaded using a rubber kneading apparatus such as an open roll mill or a Banbury mixer, and then vulcanized.

The rubber composition according to the present invention can be used for tire components, and can be suitably used for treads, sidewalls, inner sidewall layers, breaker cushions, base treads, tie gums, bead apexes, and strip apexes.

An inner sidewall layer is an inner layer of a sidewall having a multi-layer structure, and specifically may be a component as shown in, for example, FIG. 1 of JP 2007-106166 A, which is hereby incorporated by reference.

A breaker cushion is a component provided between an edge portion of a breaker and a carcass (case), and specifically may be a component as shown in, for example, FIG. 1 of JP 2006-273934 A, which is hereby incorporated by reference.

A base tread is an inner layer of a tread having a multi-layer structure. In the case of a tread having a two-layer structure [a outer surface layer (cap tread) and an inner surface layer (base tread)], the base tread is an inner surface layer.

A tie gum is a component disposed between a carcass cord and an inner liner, and specifically may be a component as shown in, for example, FIG. 1 of JP 2010-095705 A, which is hereby incorporated by reference.

Figure 2:
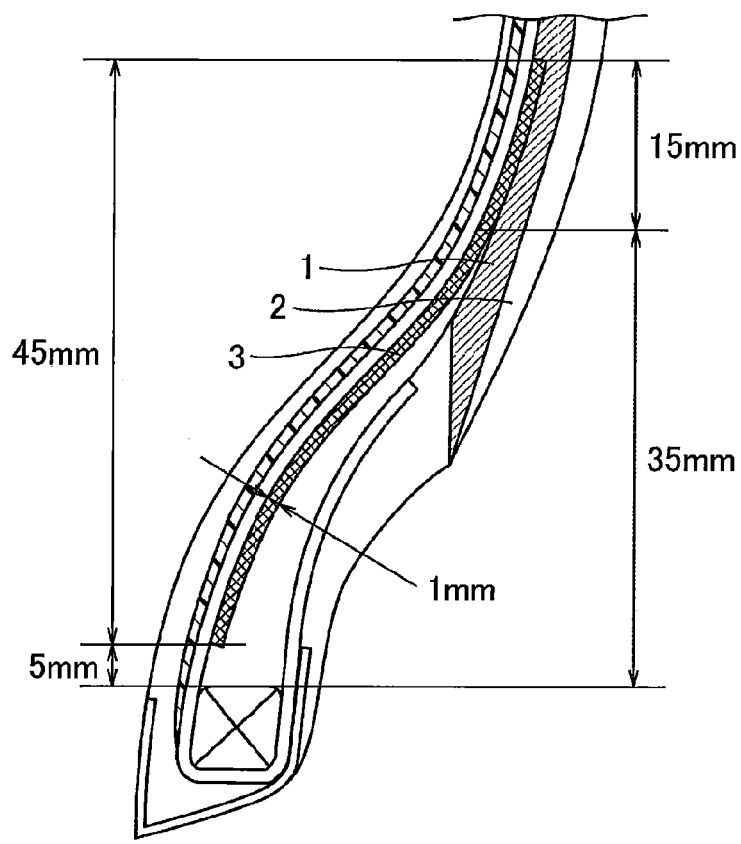
FIG. 2 is a schematic enlarged view of a cross section in the vicinity of a strip apex in the test tire shown in FIG. 1.
Figure 3:
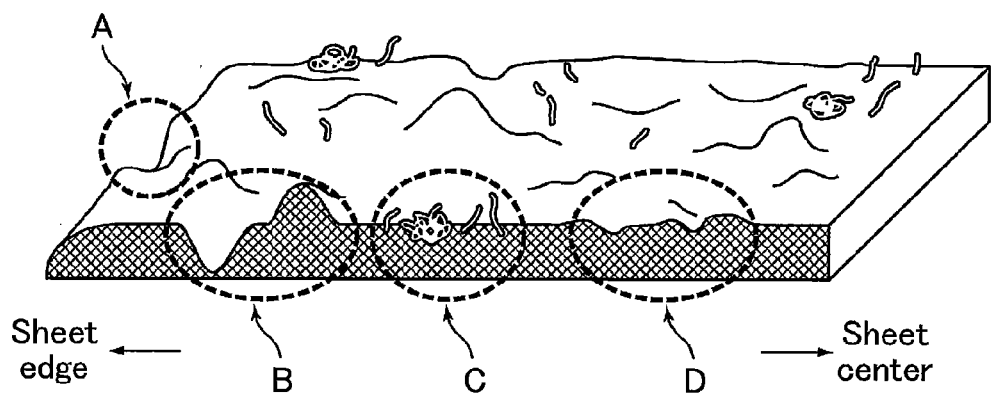
FIG. 3 is a schematic view of a sheet used in the evaluation of sheet processability.

A bead apex is a triangular component extending radially from above a bead core to approximately a position corresponding to the widest width, and specifically may be a component as shown in, for example, FIGS. 1 to 3 of JP 2008-38140 A, which is hereby incorporated by reference.

A strip apex is an inner rubber layer for reinforcing the sidewall portion, and specifically may be a component as shown in, for example, FIG. 1 of JP 2010-149677 A and FIG. 5 of JP 2008-038140 A (these documents are hereby incorporated by reference).

The pneumatic tire according to the present invention can be formed from the rubber composition by a usual method. Specifically, the rubber composition before vulcanization is extruded and processed into the shape of a sidewall or the like, arranged in a usual manner in a tire building machine, and assembled with other tire components to form an unvulcanized tire. The unvulcanized tire is then heated and pressurized in a vulcanizer, whereby a tire can be produced.

EXAMPLES

The present invention will be specifically described referring to examples, but the present invention is not limited to only these examples.

Hereinafter, the chemicals used in the production of masterbatches will be described.

Natural rubber latex: field latex available from Muhibbah LATEKS Sdn. Bhd.

SBR latex: prepared by the method below

NEOFIBER A: NEOFIBER made by OJI SEITAI KAISHA, LTD. (microfibrillated plant fibers)

NEOFIBER B: obtained by preliminarily stirring NEOFIBER A (with a homogenizer for 0.2 hours), and then immersing it in water at 23° C. for 1 hour Antioxidant: Wingstay L made by Eliokem (t-butylated condensation product of p-cresol and dicyclopentadiene)

Flocculant A: C-303H made by MT AquaPolymer, Inc. (strong cation)

Flocculant B: POIZ C-60H made by Kao Corporation (O-[2-hydroxy-3-(trimethylammonio)propyl]hydroxycellulose chloride, molecular weight: 600,000)

Flocculant C: POIZ C-150L made by Kao Corporation (O-[2-hydroxy-3-(trimethylammonio)propyl]hydroxycellulose chloride, molecular weight: 1,500,000)

Coagulating agent: 1% sulfuric acid made by Wako Pure Chemical Industries, Ltd.

(Preparation of Microfibrillated Plant Fiber Aqueous Solution)

Microfibrillated plant fibers were diluted with water by a factor of 200 (in mass ratio). Then the mixture was stirred using a cylindrical homogenizer (Auto Mixer model 20 made by PRIMIX Corporation) to prepare a microfibrillated plant fiber aqueous solution containing 0.5% by mass of microfibrillated plant fibers and 99.5% by mass of water. In the preparation, the stirring time was varied to adjust the degree of disintegration of microfibrillated plant fibers. The viscosity of the microfibrillated plant fiber aqueous solution was measured with a tuning fork vibration viscometer (SV-10 made by A&D Company, Limited) at ordinary temperature (23° C.), and the results are shown in Table 2.

(Preparation of Masterbatch)

The concentration of solids (DRC) in rubber latex was adjusted to 30% (w/v), and then 5 g of an antioxidant was added to 1000 g of the rubber latex.

Next, the rubber latex and the microfibrillated plant fiber aqueous solution were weighed and adjusted so as to give a predetermined mass ratio after drying as shown in Table 2. Then they were stirred using a cylindrical homogenizer at 8000 rpm for a period of time shown in Table 2.

Next, a flocculant shown in Table 2 was added to the mixture after stirring, and the resulting mixture was stirred using the cylindrical homogenizer at 300 rpm for 2 minutes. The amount of the flocculant added as shown in Table 2 is an amount per 100 parts by mass of the rubber component of the rubber latex used.

Next, a coagulating agent was added in steps while the mixture was stirred using the cylindrical homogenizer at 450 rpm and at a temperature of 30 to 35° C. Then the pH was adjusted to 4 to 6, so that a coagulum was obtained. The stirring time was set to 1 hour. The obtained coagulum was repeatedly washed with 1000 ml of water.

Next, the coagulum was air dried for several hours and further vacuum dried at 40° C. for 12 hours to obtain a masterbatch (MB). The thus obtained MB1 to MB14 are shown in Table 2.

SBR latex was prepared by the method described below. The chemicals used are shown below.

Water: distilled water

Emulsifier (1): rosin acid soap made by Harima Chemicals, Inc.

Emulsifier (2): fatty acid soap made by Wako Pure Chemical Industries, Ltd.

Electrolyte: sodium phosphate made by Wako Pure Chemical Industries, Ltd.

Styrene: styrene made by Wako Pure Chemical Industries, Ltd.

Butadiene: 1,3-butadiene made by TAKACHIHO CHEMICAL INDUSTRIAL CO., LTD.

Molecular weight regulator: tert-dodecyl mercaptan made by Wako Pure Chemical Industries, Ltd.

Radical initiator: paramenthane hydroroperoxide made by NOF CORPORATION

SFS: sodium formaldehyde sulfoxylate made by Wako Pure Chemical Industries, Ltd.

EDTA: sodium ethylenediaminetetraacetate made by Wako Pure Chemical Industries, Ltd.

Catalyst: ferric sulfate made by Wako Pure Chemical Industries, Ltd.

Polymerization terminator: N,N'-dimethyldithiocarbamate made by Wako Pure Chemical Industries, Ltd.

(Preparation of SBR Latex)

According to the recipe formulation shown in Table 1, a pressure-proof reactor with a stirrer was charged with water, the emulsifier (1), emulsifier (2), electrolyte, styrene, butadiene, and molecular weight regulator. The temperature of the reactor was set to 5° C., and an aqueous solution obtained by dissolving the radical initiator and SFS and an aqueous solution obtained by dissolving the EDTA and catalyst were added to the reactor to start polymerization. Five hours after the start of polymerization, the polymerization terminator was added to terminate the reaction. In this manner, SBR latex was obtained.

TABLE 1

|  |  | SBR latex |
|---|---|---|
| Charged amount (parts by mass) | Water | 200 |
|  | Emulsifier (1) | 4.5 |
|  | Emulsifier (2) | 0.15 |
|  | Electrolyte | 0.8 |
|  | Styrene | 25 |
|  | Butadiene | 75 |
|  | Molecular weight regulator | 0.2 |
|  | Radical initiator | 0.1 |
|  | SFS | 0.15 |
|  | EDTA | 0.07 |
|  | Catalyst | 0.05 |
|  | Polymerization terminator | 0.2 |

The rubber components contained in MB1 to MB14 and TSR20 were measured for the nitrogen content and the phosphorus content by the methods mentioned below. Also the pH of MB1 to MB14 was measured using a pH meter D-24 made by HORIBA, Ltd. Furthermore the productivity of MB1 to MB14 was evaluated by the method mentioned below. The results are shown in Table 2.

(Measurement of Nitrogen Content)

The nitrogen content was determined by gas chromatography following pyrolysis.

(Measurement of Phosphorus Content)

The phosphorus content was determined using an ICP optical emission spectrometer (P-4010, made by Hitachi, Ltd.).

(Productivity)

The total time of the following times (1) to (3) was expressed as an index relative to a value of 100 representing the total time of MB1:

(1) the homogenizer working time (homogenizing time) from when the microfibrillated plant fibers were milled in water until a predetermined solution viscosity was reached;

(2) the time from when the rubber latex, the microfibrillated plant fiber aqueous solution obtained after the time (1) and other additives were mixed until solids were precipitated to cause solid/liquid phase separation; and (3) the time until approximately 100% of the microfibrillated plant fibers in the liquid phase were incorporated into the solids without fail.

A larger index value indicates a shorter total time of (1) to (3) and therefore better workability. An index value of 75 or more is at an acceptable level, and an index value of 90 or more is at a level suited for commercialization.

TABLE 2

| | Rubber species | Fiber species | Flocculant | Amount of flocculant added per 100 parts by mass of rubber component (parts by mass) | Stirring time (hrs) | Solution viscosity (mPa · S) Target 5-10 | Amount of fibers per 100 parts by mass of rubber component (parts by mass) | Nitrogen content (% by mass) | Phosphorus content (ppm) | pH Target: 4.0-6.0 | Productivity Target: >75 |
|---|---|---|---|---|---|---|---|---|---|---|---|
| MB1 | NR | NEOFIBER A | Flocculant A (C303-H) | 0.5 | 4 | 7.8 | 20 | 0.33 | 425 | 5.2 | 100 |
| MB2 | NR | NEOFIBER A | Flocculant A (C303-H) | 0.5 | 4 | 7.8 | 10 | 0.33 | 415 | 5.2 | 100 |
| MB3 | NR | NEOFIBER A | Flocculant A (C303-H) | 0.5 | 4 | 7.8 | 30 | 0.33 | 430 | 5.4 | 100 |
| MB4 | NR | NEOFIBER A | Flocculant B (Poiz C-60H) | 0.5 | 4 | 7.8 | 20 | 0.34 | 430 | 5.2 | 95 |
| MB5 | NR | NEOFIBER A | Flocculant C (Poiz C-150L) | 0.5 | 4 | 7.8 | 20 | 0.34 | 420 | 5.3 | 95 |
| MB6 | NR | NEOFIBER A | Flocculant A (C303-H) | 0.1 | 4 | 7.8 | 20 | 0.34 | 415 | 4.1 | 80 |
| MB7 | NR | NEOFIBER A | Flocculant A (C303-H) | 5.0 | 4 | 7.8 | 20 | 0.34 | 405 | 5.7 | 110 |
| MB8 | NR | NEOFIBER A | Flocculant A (C303-H) | 0.008 | 4 | 7.8 | 20 | 0.34 | 425 | 4.0 | 60 |
| MB9 | NR | NEOFIBER A | Flocculant A (C303-H) | 7.0 | 4 | 7.8 | 20 | 0.31 | 405 | 7.1 | 110 |
| MB10 | NR | NEOFIBER A | — | — | 4 | 7.8 | 20 | 0.33 | 425 | 5.5 | 30 |
| MB11 | NR | NEOFIBER B | Flocculant A (C303-H) | 0.5 | 4 | 5.6 | 20 | 0.33 | 430 | 5.2 | 90 |
| MB12 | NR | NEOFIBER A | — | — | 2 | 2.4 | 20 | 0.33 | 430 | 5.3 | 120 |
| MB13 | NR | NEOFIBER A | — | — | 0.5 | 1.1 | 20 | 0.33 | 430 | 5.5 | 140 |
| MB14 | SBR | NEOFIBER A | Flocculant A (C303-H) | 0.5 | 4 | 7.8 | 20 | — | — | 5.9 | 100 |
| TSR20 | NR | — | — | — | — | — | — | 0.34 | 433 | — | — |

Hereinafter, the chemicals used in the preparation of rubber compositions for a strip apex will be described.
NR: TSR20
IR: IR2200
SBR1: SBR1502 made by Sumitomo Chemical Co., Ltd.
BR1: BUNA-CB25 made by Lanxess
BR2: VCR617 made by Ube Industries, Ltd. (SPB-containing BR)
MB1 to MB14: prepared by the method mentioned above
Microfibrillated plant fibers: NEOFIBER made by OJI SEITAI KAISHA, LTD.
Carbon black 1: SHOBLACK N219 made by Cabot Japan K.K. ($N_2SA$: 104 $m^2/g$)
Carbon black 2: SHOBLACK N550 made by Cabot Japan K.K. ($N_2SA$: 40 $m^2/g$)
Silica 1: Ultrasil VN3 made by Degussa ($N_2SA$: 175 $m^2/g$)
Silica 2: Z1085Gr made by Rhodia ($N_2SA$: 80 $m^2/g$)
Crosslinking resin 1: SUMIKANOL 620 made by TAOKA Chemical Co., Ltd. (modified resorcinol resin (modified resorcinol-formaldehyde condensate))
Crosslinking resin 2: SUMILITE RESIN PR12686 made by Sumitomo Durez Co., Ltd. (cashew oil-modified phenolic resin)
C5 Petroleum resin: Marukarez T-100AS made by Maruzen Petrochemical Co., Ltd. (C5 petroleum resin: aliphatic petroleum resin whose main raw material was an olefin or a diolefin in C5 fraction obtained by naphtha cracking; softening point: 102° C.)
Oil: vivatec 500 made by H&R
Zinc oxide: Ginrei R made by TOHO ZINC CO., LTD.
Silane coupling agent: Si75 made by Degussa
Stearic acid: stearic acid "Tsubaki" made by NOF CORP.
Antioxidant 6PPD: Antigene 6C made by Sumitomo Chemical Co., Ltd. (N-phenyl-N'-(1,3-dimethylbutyl)-p-phenylenediamine)
Wax: OZOACE 0355 made by NIPPON SEIRO CO., LTD.
20% Oil-containing insoluble sulfur: CRYSTEX HS OT20 made by Flexsys (insoluble sulfur containing 80% by mass of sulfur and 20% by mass of oil)
Alkylphenol-sulfur chloride condensate: TACKIROL V200 made by TAOKA Chemical Co., Ltd.
Methylene donor 1: SUMIKANOL 507A made by Sumitomo Chemical Co., Ltd. (containing 65% by mass of a modified etherified methylol melamine resin (partial condensate of HMMPME) and 35% by mass of silica and oil)
Methylene donor 2: NOCCELER H made by Ouchi Shinko Chemical Industrial Co., Ltd. (hexamethylenetetramine (HMT))
Vulcanization accelerator TBBS: NOCCELER NS made by Ouchi Shinko Chemical Industrial Co., Ltd. (N-tert-butyl-2-benzothiazolylsulfeneamide)

Examples and Comparative Examples

According to each compounding formulation shown in the upper portion of Table 3 or 4, the chemicals other than the sulfur, vulcanization accelerator and alkylphenol-sulfur chloride condensate were kneaded using a 1.7 L Banbury mixer made by Kobe Steel, Ltd. Next, the sulfur, vulcanization accelerator and alkylphenol-sulfur chloride condensate were added to the obtained kneaded mixture and they were kneaded using an open roll mill to prepare an unvulcanized rubber composition.

The obtained unvulcanized rubber composition was extruded and processed into the shape of a strip apex at a discharge temperature of 115° C. using a cold feed extruder, and was then assembled with other tire components such as a bead apex, an inner sidewall layer, and an outer sidewall layer to prepare a raw tire. The raw tire was vulcanized at 170° C. for 12 minutes to obtain a test tire (205/65R15). The schematic view of a cross section of the obtained test tire is shown in FIG. 1, and the schematic enlarged view of a cross section in the vicinity of the strip apex in the test tire is shown in FIG. 2.

(Viscoelasticity Test 1)

A rubber test strip was cut out from the obtained test tire such that the long side of the test strip was along the circumferential direction about the tire axis, to prepare a rubber test piece 1 (size: length 20 mm, width 3 mm, and thickness 2 mm). Another rubber test strip was also cut out such that the long side of the test strip was along the radial direction about the tire axis, to prepare a rubber test piece 2 (size: the same as that of the rubber test piece 1).

The complex modulus $E^*a$ (MPa) in the circumferential direction of the tire and the complex modulus $E^*b$ (MPa) in the radial direction of the tire were measured for the obtained rubber test pieces 1 and 2, using a viscoelasticity spectrometer VES made by Iwamoto Seisakusho Co., Ltd. under the conditions: temperature 70° C., frequency 10 Hz, initial strain 10%, and dynamic strain 2% (strain in the longitudinal direction). A larger value of $E^*$ indicates higher rigidity.

A value of $E^*a$ in the target range indicates better steering response and higher handling stability. A value of $E^*a/E^*b$ in the target range indicates a better transient characteristic (easier returning of a vehicle when the steering wheel is returned to the straight-ahead position immediately after cornering with a certain steering angle).

In addition, the tan δ of the rubber test piece 1 was measured by the above evaluation method. A smaller value of tan δ (at 70° C.) indicates better fuel economy.

(Tensile Test)

A No. 3 dumbbell specimen prepared from the rubber test piece 1 was subjected to a tensile test at ordinary temperature according to JIS K 6251 2010 "Rubber, vulcanized or thermoplastic—Determination of tensile stress-strain properties" to determine the elongation at break EB (%) of the specimen. A greater elongation at break EB (%) indicates higher durability.

(Sheet Processability)

Each of the unvulcanized rubber compositions was extruded and then shaped into a sheet having a thickness of 1.0 mm. The shaped product was visually or tactually evaluated for the edge conditions, the degree of rubber scorch, the degree of adhesion between rubber products, the flatness, and the presence or absence of agglomerates and protrusions of microfibrillated plant fibers. The results were expressed as indices relative to the results of Comparative Example 1 taken as 100. A larger index value indicates higher sheet processability.

With respect to the edge conditions, the straight and smooth edges were evaluated as good. With respect to the degree of rubber scorch, the absence of irregularities due to cured bits on a 15-cm-square, 2-mm-thick sheet cut out from the shaped product was evaluated as good. With respect to the flatness, the sheet that was flat enough to adhere tightly to a flat plate was evaluated as good. The presence of agglomerates and protrusions of microfibrillated plant fibers was visually observed and evaluated relative to a reference level: 0.1 pieces/$cm^2$ (10 pieces/100 $cm^2$) on a section of the rubber sheet. The schematic view of the sheet is shown in FIG. 3. In FIG. 3, a region A indicates an area having poor edge conditions (an area having a concave edge portion), a region B indicates an area having irregularities due to cured bits, a region C indicates an area containing agglomerates and protrusions of microfibrillated plant fibers, and a region D indicates an area having poor flatness.

(Handling Stability, Riding Comfort)

The test tire (205/65R15) was mounted on all the wheels of a vehicle (engine size: 3000 cc). Then a test driver drove the vehicle on a test course under standard running conditions. The test driver sensory evaluated the control stability during steering (handling stability) and the riding comfort of the vehicle. The results were expressed as indices relative to the results of Comparative Example 1 taken as 100. A larger index value of handling stability indicates higher handling stability. A larger index value of riding comfort indicates better riding comfort.

(Rolling Resistance)

The rolling resistance of the test tire was measured using a rolling resistance tester with a center rim of JIS standard at an internal pressure of 230 kPa, a load of 3.43 kN, and a speed of 80 km/h, according to JIS D 4234:2009. Then the improvement rate of the rolling resistance (the rate of decrease in rolling resistance) was calculated from the following equation:

(Improvement rate of rolling resistance)=[(rolling resistance of Comparative Example 1)−(rolling resistance of each composition)]/(rolling resistance of Comparative Example 1)×100.

TABLE 3

Strip apex formulation

| | | | Comparative Example | | | | | | |
|---|---|---|---|---|---|---|---|---|---|
| | | | 1 | 2 | 3 | 4 | 5 | 6 | 7 |
| Formulation (part(s) by mass) | NR (TSR20) | | 80 | 80 | 80 | 80 | 60 | 60 | — |
| | IR (IR2200) | | — | — | — | — | 20 | 20 | 20 |
| | SBR1 (SBR1502) | | 20 | 20 | 20 | 20 | 20 | 20 | 20 |
| | BR1 (CB25) | | — | — | — | — | — | — | — |
| | BR2 (VCR617) | | — | — | — | — | — | — | 60 |
| | MB | Number | | | | | | | |
| | | Amount | | | | | | | |
| | | (Rubber fraction) | | | | | | | |
| | | (Fiber fraction) | | | | | | | |
| | Microfibrillated plant fibers | | — | — | — | — | — | 10 | — |
| | Carbon black 1(N219) | | 37 | 37 | 37 | — | — | 37 | — |
| | Carbon black 2(N550) | | — | — | 13 | 60 | 60 | — | 60 |
| | Silica 1(VN3) | | 10 | 10 | 10 | — | — | 10 | — |
| | Silica 2(Z1085Gr) | | — | — | — | — | — | — | — |
| | (Total content of filler) | | 47 | 47 | 60 | 60 | 60 | 47 | 60 |
| | Crosslinking resin 1(Sumikanol 620) | | — | 1.5 | — | — | — | — | — |
| | Crosslinking resin 2(PR12686) | | 3 | — | 15 | 15 | 15 | 3 | 15 |
| | C5 petroleum resin | | 2 | 2 | 2 | 2 | 2 | 2 | 2 |
| | Oil | | — | — | — | — | — | — | — |
| | Zinc oxide | | 5 | 5 | 5 | 5 | 5 | 5 | 5 |
| | Silane coupling agent (Si75) | | — | — | — | — | — | — | — |
| | Stearic acid | | 2 | 2 | 2 | 2 | 2 | 2 | 2 |
| | Antioxidant 6PPD | | 1 | 1 | 1 | 1 | 1 | 1 | 1 |
| | Wax | | 1.5 | 1.5 | 1.5 | 1.5 | 1.5 | 1.5 | 1.6 |
| | 20% oil-containing insoluble sulfur | | 3.13 | 3.13 | 3.13 | 3.13 | 6.25 | 3.13 | 6.25 |
| | Alkylphenol-sulfur chloride condensate | | 2 | 2 | 2 | 2 | 2 | 2 | 2 |
| | Methylene donor 1(Sumikanol 507A) | | 1.44 | 1.75 | — | — | — | 1.44 | — |
| | Methylene donor 2(HMT) | | — | — | 1.5 | 1.5 | 1.5 | — | 1.5 |
| | Vulcanization accelerator TBBS | | 1.1 | 1.1 | 1.1 | 1.1 | 1.1 | 1.1 | 1.1 |
| Evaluation | $E^*$($E^*a$) in tire circumferential direction (at 70° C.), Target: 7~100 | | 10.16 | 6.82 | 28.5 | 41.2 | 61.2 | 40.8 | 71.5 |
| | $E^*$($E^*b$) in tire radial direction (at 70° C.) | | 10.16 | 6.82 | 28.50 | 41.62 | 60.59 | 13.64 | 65.60 |
| | $E^*a/E^*b$ ratio, Target: 1.05~6.00 | | 1.00 | 1.00 | 1.00 | 0.99 | 1.01 | 2.99 | 1.09 |
| | tan δ (at 70° C.) | | 0.125 | 0.130 | 0.155 | 0.120 | 0.114 | 0.135 | 0.129 |
| | Elongation at break EB (%), Target: >200 | | 475 | 470 | 295 | 245 | 105 | 245 | 85 |
| | Sheet processability index, Target: ≥90 | | 100 | 100 | 95 | 100 | 85 | 60 | 105 |
| | Handling stability index | | 100 | 80 | 115 | 125 | 130 | 127 | 135 |
| | Riding comfort index | | 100 | 110 | 90 | 80 | 70 | 100 | 70 |
| | Improvement rate of rolling resistance (%), Target: ≥−1.0 | | Reference | −0.4 | −2.4 | 0.4 | 0.9 | −0.8 | −0.3 |

| | | | Comparative Example | | | | | |
|---|---|---|---|---|---|---|---|---|
| | | | 8 | 9 | 10 | 11 | 12 | 13 |
| Formulation (part(s) by mass) | NR (TSR20) | | — | 30 | 30 | 30 | 30 | 30 |
| | IR (IR2200) | | 40 | — | — | — | — | — |
| | SBR1 (SBR1502) | | — | 20 | 20 | 20 | 20 | 20 |
| | BR1 (CB25) | | — | — | — | — | — | — |
| | BR2 (VCR617) | | 60 | — | — | — | — | — |
| | MB | Number | — | 8 | 9 | 10 | 12 | 13 |
| | | Amount | | 60 | 60 | 60 | 60 | 60 |
| | | (Rubber fraction) | | 50 | 50 | 50 | 50 | 50 |
| | | (Fiber fraction) | | 10 | 10 | 10 | 10 | 10 |

TABLE 3-continued

Strip apex formulation

|  |  |  |  |  |  |  |  |
|---|---|---|---|---|---|---|---|
|  | Microfibrillated plant fibers | — | — | — | — | — | — |
|  | Carbon black 1(N219) | — | 37 | 37 | 37 | 37 | 37 |
|  | Carbon black 2(N550) | 60 | — | — | — | — | — |
|  | Silica 1(VN3) | — | 10 | 10 | 10 | 10 | 10 |
|  | Silica 2(Z1085Gr) | — | — | — | — | — | — |
|  | (Total content of filler) | 60 | 47 | 47 | 47 | 47 | 47 |
|  | Crosslinking resin 1(Sumikanol 620) | — | — | — | — | — | — |
|  | Crosslinking resin 2(PR12686) | 15 | 3 | 3 | 3 | 3 | 3 |
|  | C5 petroleum resin | 2 | 2 | 2 | 2 | 2 | 2 |
|  | Oil | — | — | — | — | — | — |
|  | Zinc oxide | 5 | 5 | 5 | 5 | 5 | 5 |
|  | Silane coupling agent (Si75) | — | — | — | — | — | — |
|  | Stearic acid | 2 | 2 | 2 | 2 | 2 | 2 |
|  | Antioxidant 6PPD | 1 | 1 | 1 | 1 | 1 | 1 |
|  | Wax | 1.5 | 1.5 | 1.5 | 1.5 | 1.5 | 1.5 |
|  | 20% oil-containing insoluble sulfur | 6.25 | 3.13 | 3.13 | 3.13 | 3.13 | 3.13 |
|  | Alkylphenol-sulfur chloride condensate | 2 | 2 | 2 | 2 | 2 | 2 |
|  | Methylene donor 1(Sumikanol 507A) | — | 1.44 | 1.44 | 1.44 | 1.44 | 1.44 |
|  | Methylene donor 2(HMT) | 1.5 | — | — | — | — | — |
|  | Vulcanization accelerator TBBS | 1.1 | 1.1 | 1.1 | 1.1 | 1.1 | 1.1 |
| Evaluation | $E^*(E^*a)$ in tire circumferential direction (at 70° C.), Target: 7~100 | 65.4 | 38.2 | 39.1 | 37.5 | 28.4 | 18.5 |
|  | $E^*(E^*b)$ in tire radial direction (at 70° C.) | 59.45 | 13.13 | 13.03 | 13.02 | 9.96 | 7.55 |
|  | $E^*a/E^*b$ ratio, Target: 1.05~6.00 | 1.10 | 2.91 | 3.00 | 2.88 | 2.85 | 2.45 |
|  | tan δ (at 70° C.) | 0.123 | 0.142 | 0.154 | 0.152 | 0.124 | 0.116 |
|  | Elongation at break EB (%), Target: >200 | 105 | 295 | 305 | 305 | 185 | 345 |
|  | Sheet processability index, Target: ≥90 | 105 | 100 | 105 | 80 | 85 | 60 |
|  | Handling stability index | 130 | 120 | 120 | 120 | 110 | 115 |
|  | Riding comfort index | 75 | 100 | 100 | 100 | 100 | 100 |
|  | Improvement rate of rolling resistance (%), Target: ≥−1.0 | 0.2 | −1.4 | −2.3 | −2.2 | 0.1 | 0.7 |

TABLE 4

Strip apex formulation

|  |  |  | Example |  |  |  |  |  |  |  |  |
|---|---|---|---|---|---|---|---|---|---|---|---|
|  |  |  | 1 | 2 | 3 | 4 | 5 | 6 | 7 | 8 | 9 |
| Formulation (part(s) by mass) | NR (TSR20) |  | 70 | 55 | 30 | 70 | 55 | 30 | 55 | 55 | 55 |
|  | IR (IR2200) |  | — | — | — | — | — | — | — | — | — |
|  | SBR1 (SBR1502) |  | 20 | 20 | 20 | 20 | 20 | 20 | 20 | 20 | 20 |
|  | BR1 (CB25) |  | — | — | — | — | — | — | — | — | — |
|  | BR2 (VCR617) |  | — | — | — | — | — | — | — | — | — |
|  | MB | Number | 1 | 1 | 1 | 1 | 1 | 1 | 1 | 1 | 1 |
|  |  | Amount | 12 | 30 | 60 | 12 | 30 | 60 | 30 | 30 | 30 |
|  |  | (Rubber fraction) | 10 | 25 | 50 | 10 | 25 | 50 | 25 | 25 | 25 |
|  |  | (Fiber fraction) | 2 | 5 | 10 | 2 | 5 | 10 | 5 | 5 | 5 |
|  | Microfibrillated plant fibers |  | — | — | — | — | — | — | — | — | — |
|  | Carbon black 1(N219) |  | 37 | 37 | 37 | 37 | 37 | 37 | 37 | 37 | 37 |
|  | Carbon black 2(N550) |  | — | — | — | — | — | — | — | — | — |
|  | Silica 1(VN3) |  | 10 | 10 | 10 | 10 | 10 | 10 | 10 | 10 | 10 |
|  | Silica 2(Z1085Gr) |  | — | — | — | — | — | — | — | — | — |
|  | (Total content of filler) |  | 47 | 47 | 47 | 47 | 47 | 47 | 47 | 47 | 47 |
|  | Crosslinking resin 1(Sumikanol 620) |  | — | — | — | 1.5 | 1.5 | 1.5 | — | — | — |
|  | Crosslinking resin 2(PR12686) |  | 3 | 3 | 3 | — | — | — | 6 | 9 | 12 |
|  | C5 petroleum resin |  | 2 | 2 | 2 | 2 | 2 | 2 | 2 | 2 | 2 |
|  | Oil |  | — | — | — | — | — | — | — | — | — |
|  | Zinc oxide |  | 5 | 5 | 5 | 5 | 5 | 5 | 5 | 5 | 5 |
|  | Silane coupling agent (Si75) |  | — | — | — | — | — | — | — | — | — |
|  | Stearic acid |  | 2 | 2 | 2 | 2 | 2 | 2 | 2 | 2 | 2 |
|  | Antioxidant 6PPD |  | 1 | 1 | 1 | 1 | 1 | 1 | 1 | 1 | 1 |
|  | Wax |  | 1.5 | 1.5 | 1.5 | 1.5 | 1.5 | 1.5 | 1.5 | 1.5 | 1.5 |
|  | 20% oil-containing insoluble sulfur |  | 3.13 | 3.13 | 3.13 | 3.13 | 3.13 | 3.13 | 3.13 | 3.13 | 3.13 |
|  | Alkylphenol-sulfur chloride condensate |  | 2 | 2 | 2 | 2 | 2 | 2 | 2 | 2 | 2 |
|  | Methylene donor 1(Sumikanol 507A) |  | 1.44 | 1.44 | 1.44 | 1.44 | 1.44 | 1.44 | 2.88 | 4.32 | — |
|  | Methylene donor 2(HMT) |  | — | — | — | — | — | — | — | — | 1.2 |
|  | Vulcanization accelerator TBBS |  | 1.1 | 1.1 | 1.1 | 1.1 | 1.1 | 1.1 | 1.1 | 1.1 | 1.1 |

TABLE 4-continued

Strip apex formulation

| | | | | | | | | | | |
|---|---|---|---|---|---|---|---|---|---|---|
| Evaluation | E*(E*a) in tire circumferential direction (at 70° C.), Target: 7~100 | 12.5 | 17.3 | 42.7 | 9.6 | 13.8 | 32.2 | 28.0 | 41.2 | 59.5 |
| | E*(E*b) in tire radial direction (at 70° C.) | 10.59 | 11.14 | 13.51 | 8.53 | 8.66 | 10.35 | 13.91 | 14.46 | 24.29 |
| | E*a/E*b ratio, Target: 1.05~6.00 | 1.18 | 1.55 | 3.16 | 1.12 | 1.59 | 3.11 | 2.01 | 2.85 | 2.45 |
| | tan δ (at 70° C.) | 0.137 | 0.107 | 0.116 | 0.129 | 0.121 | 0.114 | 0.107 | 0.109 | 0.112 |
| | Elongation at break EB (%), Target: >200 | 445 | 405 | 335 | 430 | 365 | 290 | 330 | 265 | 205 |
| | Sheet processability index. Target: ≥90 | 105 | 105 | 105 | 100 | 100 | 100 | 105 | 105 | 105 |
| | Handling stability index | 105 | 110 | 130 | 100 | 106 | 120 | 115 | 128 | 130 |
| | Riding comfort index | 100 | 100 | 100 | 105 | 104 | 100 | 100 | 98 | 90 |
| | Improvement rate of rolling resistance (%), Target: ≥−1.0 | −1.0 | 1.4 | 0.7 | −0.3 | 0.3 | 0.9 | 1.4 | 1.3 | 1.0 |

| | | | Example | | | | | | | | |
|---|---|---|---|---|---|---|---|---|---|---|---|
| | | | 10 | 11 | 12 | 13 | 14 | 15 | 16 | 17 | 18 |
| Formulation (part(s) by mass) | NR (TSR20) | | 30 | 30 | 30 | 30 | 10 | 30 | — | 30 | 13 |
| | IR (IR2200) | | — | — | — | — | — | — | — | — | — |
| | SBR1 (SBR1502) | | 20 | 20 | 20 | 20 | — | 20 | — | 20 | 20 |
| | BR1 (CB25) | | — | — | — | — | 40 | — | — | — | — |
| | BR2 (VCR617) | | — | — | — | — | — | — | — | — | — |
| | MB | Number | 1 | 1 | 1 | 1 | 1 | 2 | 2 | 3 | 3 |
| | | Amount | 60 | 60 | 60 | 60 | 60 | 55 | 110 | 65 | 87 |
| | | (Rubber fraction) | 50 | 50 | 50 | 50 | 50 | 50 | 100 | 50 | 67 |
| | | (Fiber fraction) | 10 | 10 | 10 | 10 | 10 | 5 | 10 | 15 | 20 |
| | Microfibrillated plant fibers | | — | — | — | — | — | — | — | — | — |
| | Carbon black 1(N219) | | 42 | 37 | 37 | 40 | 37 | 37 | 37 | — | 25 |
| | Carbon black 2(N550) | | — | — | — | — | — | — | — | 60 | — |
| | Silica 1(VN3) | | 10 | 20 | 10 | — | 10 | 10 | 10 | 10 | — |
| | Silica 2(Z1085Gr) | | — | — | — | 10 | — | — | — | — | — |
| | (Total content of filler) | | 52 | 57 | 47 | 50 | 47 | 47 | 47 | 70 | 25 |
| | Crosslinking resin 1(Sumikanol 620) | | — | — | — | — | — | — | — | — | — |
| | Crosslinking resin 2(PR12686) | | 3 | 3 | 3 | 3 | 3 | 3 | 3 | 3 | 15 |
| | C5 petroleum resin | | 2 | 2 | 2 | 2 | 2 | 2 | 2 | 2 | 2 |
| | Oil | | — | — | — | — | — | — | — | — | — |
| | Zinc oxide | | 5 | 5 | 5 | 5 | 5 | 5 | 5 | 5 | 5 |
| | Silane coupling agent (Si75) | | — | 1.6 | — | — | — | — | — | — | — |
| | Stearic acid | | 2 | 2 | 2 | 2 | 2 | 2 | 2 | 2 | 2 |
| | Antioxidant 6PPD | | 1 | 1 | 1 | 1 | 1 | 1 | 1 | 1 | 1 |
| | Wax | | 1.5 | 1.5 | 1.5 | 1.5 | 1.5 | 1.5 | 1.5 | 1.5 | 1.5 |
| | 20% oil-containing insoluble sulfur | | 3.13 | 3.13 | 3.13 | 3.13 | 3.13 | 3.13 | 3.13 | 3.13 | 3.13 |
| | Alkylphenol-sulfur chloride condensate | | 2 | 2 | — | 2 | 2 | 2 | 2 | 2 | 2 |
| | Methylene donor 1(Sumikanol 507A) | | 1.44 | 1.44 | 1.44 | 1.44 | 1.44 | 1.44 | 1.44 | 1.44 | — |
| | Methylene donor 2(HMT) | | — | — | — | — | — | — | — | — | 1.5 |
| | Vulcanization accelerator TBBS | | 1.1 | 1.1 | 1.1 | 1.1 | 1.1 | 1.1 | 1.1 | 1.1 | 1.1 |
| Evaluation | E*(E*a) in tire circumferential direction (at 70° C.), Target: 7~100 | | 52.1 | 54.1 | 38.7 | 43.1 | 42.2 | 17.1 | 38.9 | 73.5 | 44.8 |
| | E*(E*b) in tire radial direction (at 70° C.) | | 16.75 | 16.96 | 12.32 | 13.60 | 13.11 | 11.03 | 11.82 | 23.41 | 13.02 |
| | E*a/E*b ratio, Target: 1.05~6.00 | | 3.11 | 3.19 | 3.14 | 3.17 | 3.22 | 1.55 | 3.29 | 3.14 | 3.44 |
| | tan δ (at 70° C.) | | 0.135 | 0.129 | 0.134 | 0.115 | 0.106 | 0.106 | 0.099 | 0.121 | 0.105 |
| | Elongation at break EB (%), Target: >200 | | 295 | 315 | 370 | 240 | 315 | 410 | 395 | 210 | 355 |
| | Sheet processability index. Target: ≥90 | | 105 | 95 | 105 | 105 | 95 | 105 | 90 | 95 | 95 |
| | Handling stability index | | 125 | 125 | 125 | 130 | 130 | 110 | 125 | 135 | 130 |
| | Riding comfort index | | 95 | 95 | 100 | 100 | 100 | 100 | 100 | 90 | 100 |
| | Improvement rate of rolling resistance (%), Target: ≥−1.0 | | −0.8 | −0.3 | −0.7 | 0.8 | 1.5 | 1.5 | 2.1 | 0.3 | 1.6 |

| | | | Example | | | | | | | | |
|---|---|---|---|---|---|---|---|---|---|---|---|
| | | | 19 | 20 | 21 | 22 | 23 | 24 | 25 | 26 | |
| Formulation (part(s) by mass) | NR (TSR20) | | 47 | 30 | 30 | 30 | 30 | 30 | 30 | 70 | |
| | IR (IR2200) | | — | — | — | — | — | — | — | — | |
| | SBR1 (SBR1502) | | 20 | 20 | 20 | 20 | 20 | 20 | 20 | — | |
| | BR1 (CB25) | | — | — | — | — | — | — | — | — | |
| | BR2 (VCR617) | | — | — | — | — | — | — | — | — | |
| | MB | Number | 3 | 3 | 4 | 5 | 6 | 7 | 11 | 14 | |
| | | Amount | 43 | 65 | 60 | 60 | 60 | 60 | 60 | 36 | |
| | | (Rubber fraction) | 33 | 50 | 50 | 50 | 50 | 50 | 50 | 30 | |
| | | (Fiber fraction) | 10 | 15 | 10 | 10 | 10 | 10 | 10 | 6 | |
| | Microfibrillated plant fibers | | — | — | — | — | — | — | — | — | |
| | Carbon black 1(N219) | | 37 | 37 | 37 | 37 | 37 | 37 | 37 | 37 | |
| | Carbon black 2(N550) | | — | — | — | — | — | — | — | — | |

TABLE 4-continued

| | Strip apex formulation | | | | | | | | |
|---|---|---|---|---|---|---|---|---|---|
| | Silica 1(VN3) | 10 | 10 | 10 | 10 | 10 | 10 | 10 | 10 |
| | Silica 2(Z1085Gr) | — | — | — | — | — | — | — | — |
| | (Total content of filler) | 47 | 47 | 47 | 47 | 47 | 47 | 47 | 47 |
| | Crosslinking resin 1(Sumikanol 620) | — | — | — | — | — | — | — | — |
| | Crosslinking resin 2(PR12686) | 3 | 3 | 3 | 3 | 3 | 3 | 3 | 3 |
| | C5 petroleum resin | 2 | 2 | 2 | 2 | 2 | 2 | 2 | 2 |
| | Oil | — | — | — | — | — | — | — | — |
| | Zinc oxide | 5 | 5 | 5 | 5 | 5 | 5 | 5 | 5 |
| | Silane coupling agent (Si75) | — | — | — | — | — | — | — | — |
| | Stearic acid | 2 | 2 | 2 | 2 | 2 | 2 | 2 | 2 |
| | Antioxidant 6PPD | 1 | 1 | 1 | 1 | 1 | 1 | 1 | 1 |
| | Wax | 1.5 | 1.5 | 1.5 | 1.5 | 1.5 | 1.5 | 1.5 | 1.5 |
| | 20% oil-containing insoluble sulfur | 3.13 | 3.13 | 3.13 | 3.13 | 3.13 | 3.13 | 3.13 | 3.13 |
| | Alkylphenol-sulfur chloride condensate | 2 | 2 | 2 | 2 | 2 | 2 | 2 | 2 |
| | Methylene donor 1(Sumikanol 507A) | 1.44 | 1.44 | 1.44 | 1.44 | 1.44 | 1.44 | 1.44 | 1.44 |
| | Methylene donor 2(HMT) | — | — | — | — | — | — | — | — |
| | Vulcanization accelerator TBBS | 1.1 | 1.1 | 1.1 | 1.1 | 1.1 | 1.1 | 1.1 | 1.1 |
| Evaluation | $E^*(E^*a)$ in tire circumferential direction (at 70° C.), Target: 7~100 | 40.8 | 59.8 | 41.5 | 42.1 | 38.2 | 39.1 | 29.5 | 28.4 |
| | $E^*(E^*b)$ in tire radial direction (at 70° C.) | 14.12 | 18.34 | 13.34 | 13.54 | 13.13 | 13.03 | 9.67 | 9.25 |
| | $E^*a/E^*b$ ratio, Target: 1.05~6.00 | 2.89 | 3.26 | 3.11 | 3.11 | 2.91 | 3.00 | 3.05 | 3.07 |
| | tan δ (at 70° C.) | 0.124 | 0.119 | 0.121 | 0.119 | 0.132 | 0.138 | 0.117 | 0.121 |
| | Elongation at break EB (%), Target: >200 | 290 | 280 | 320 | 315 | 295 | 305 | 325 | 325 |
| | Sheet processability index. Target: ≥90 | 100 | 95 | 105 | 105 | 100 | 105 | 105 | 110 |
| | Handling stability index | 125 | 135 | 130 | 130 | 120 | 120 | 110 | 110 |
| | Riding comfort index | 99 | 94 | 100 | 100 | 100 | 100 | 100 | 100 |
| | Improvement rate of rolling resistance (%), Target: ≥−1.0 | 0.1 | 0.5 | 0.3 | 0.5 | −0.6 | −1.0 | 0.6 | 0.3 |

As shown in Tables 3 and 4, in Examples using MB obtained by mixing rubber latex, microfibrillated plant fibers and a predetermined amount of a cationic polymer, the handling stability, riding comfort, and durability were improved in a balanced manner compared with Comparative Example 1. In addition, good fuel economy and processability were obtained in Examples.

In contrast, in Comparative Examples 2 to 5 without addition of MB, the handling stability or riding comfort did not meet the target range and therefore the balance of performance properties was poor.

In Comparative Example 6 in which microfibrillated plant fibers were introduced during kneading, the microfibrillated plant fibers could not be sufficiently dispersed in the rubber composition and therefore the processability was significantly poor.

In Comparative Examples 7 and 8 in which VCR617 was added, good handling stability was obtained; however, the elongation at break was significantly poor.

In Comparative Examples 9 and 10 each using a masterbatch in which the amount of a cationic polymer added was outside the predetermined range, the fuel economy was poor.

In Comparative Examples 11 to 13 in which no cationic polymer was used in the preparation of a masterbatch, although coagulation of the masterbatch could be achieved, the microfibrillated plant fibers were insufficiently milled and therefore the microfibrillated plant fibers could not be sufficiently dispersed in the rubber composition, thereby resulting in poor performance properties including processability. Also in Comparative Examples 12 and 13, the complex modulus E* was lower than that in other examples.

In the aforementioned Examples, the results when the present invention was applied to a strip apex were demonstrated. The same effect can be obtained when the present invention is applied to other tire components such as an inner sidewall layer, a bead apex, and a wing.

Hereinafter, the chemicals used in the preparation of rubber compositions for a tread will be described.

NR: TSR20
MB1, MB12, and MB13: prepared in production examples mentioned above
BR1: BUNA-CB25 made by Lanxess
SBR2: HPR355 made by JSR Corporation (modified S-SBR, styrene content: 27% by mass, vinyl content: 55% by mass)
Carbon black 3: SHOBLACK N220 made by Cabot Japan K.K. ($N_2SA$: 111 $m^2/g$)
Silica 1: Ultrasil VN3 made by Degussa ($N_2SA$: 175 $m^2/g$)
Aromatic vinyl polymer: SYLVARES SA85 made by Arizona chemical (copolymer of α-methylstyrene and styrene, softening point: 85° C., Mw: 1000)
Oil: vivatec 500 made by H&R
Wax: OZOACE 0355 made by NIPPON SEIRO CO., LTD.
Antioxidant 6PPD: Antigene 6C made by Sumitomo Chemical Co., Ltd. (N-phenyl-N'-(1,3-dimethylbutyl)-p-phenylenediamine)
Antioxidant TMQ: NOCRAC 224 made by Ouchi Shinko Chemical Industrial Co., Ltd. (2,2,4-trimethyl-1,2-dihydroquinoline polymer)
Stearic acid: stearic acid "Tsubaki" made by NOF CORP.
Zinc oxide: Ginrei R made by TOHO ZINC CO., LTD.
Silane coupling agent: Si75 made by Degussa
5% Oil-containing powder sulfur: HK-200-5 made by Hosoi Chemical Industry Co., Ltd. (oil content: 5% by mass)
Vulcanization accelerator TBBS: NOCCELER NS made by Ouchi Shinko Chemical Industrial Co., Ltd. (N-tert-butyl-2-benzothiazolylsulfeneamide)
Vulcanization accelerator DPG: NOCCELER D made by Ouchi Shinko Chemical Industrial Co., Ltd. (N,N'-diphenylguanidine)

Examples and Comparative Examples

According to each compounding formulation shown in the upper portion of Table 5, the chemicals other than the sulfur and vulcanization accelerators were kneaded for 5 minutes using a 1.7 L Banbury mixer made by Kobe Steel, Ltd., and then discharged at 150° C. Next, the kneaded mixture was re-milled for 3 minutes using the same 1.7 L Banbury mixer, and then discharged at 150° C. Finally, the sulfur and vulcanization accelerators were added to the resulting kneaded mixture and they were kneaded at 95° C. for 5 minutes to prepare an unvulcanized rubber composition. The obtained unvulcanized rubber composition was press-vulcanized at 170° C. for 12 minutes to obtain a vulcanized rubber composition.

Moreover, the obtained unvulcanized rubber composition was formed into the shape of a tread, assembled with other tire components in a tire building machine, and press-vulcanized at 170° C. for 12 minutes to form a test tire (tire size: 205/65R15). The performances of the thus obtained vulcanized rubber compositions and test tires were evaluated based on the following tests.

sensory evaluated the steering response during the driving (the response of the vehicle to a minute change in steering angle). The results were expressed as indices relative to the results of Comparative Example 14 taken as 100. A larger index value indicates better steering response.

(Abrasion Resistance)

The test tire was mounted on an FR car made in Japan (2000 cc displacement). Then the car was driven on a test course with a dry asphalt surface. After the driving, the remaining depth of the grooves in the tread rubber of the tire was measured (initial depth: 15 mm). The results were expressed as indices relative to the remaining depth of the grooves of Comparative Example 14 taken as 100. A larger index value indicates higher abrasion resistance.

TABLE 5

Tread formulation

| | | | Comparative Example | | | Example | | | | |
|---|---|---|---|---|---|---|---|---|---|---|
| | | | 14 | 15 | 16 | 27 | 28 | 29 | 30 | 31 |
| Formulation (part(s) by mass) | NR (TSR20) | | 20 | 10 | 10 | 17.5 | 15 | 10 | — | — |
| | MB | Number | — | 12 | 13 | 1 | 1 | 1 | 1 | 1 |
| | | Amount | | 12 | 12 | 3 | 6 | 12 | 24 | 36 |
| | | (Rubber fraction) | | 10 | 10 | 2.5 | 5 | 10 | 20 | 30 |
| | | (Fiber fraction) | | 2 | 2 | 0.5 | 1 | 2 | 4 | 6 |
| | BR1 (CB25) | | 35 | 35 | 35 | 35 | 35 | 35 | 35 | 35 |
| | SBR2 (HPR355) | | 45 | 45 | 45 | 45 | 45 | 45 | 45 | 35 |
| | Carbon black 3(N220) | | 10 | 10 | 10 | 10 | 10 | 10 | 10 | 10 |
| | Silica 1(VN3) | | 75 | 75 | 75 | 75 | 75 | 75 | 75 | 75 |
| | Aromatic vinyl polymer | | 12 | 12 | 12 | 12 | 12 | 12 | 12 | 12 |
| | Oil | | 12 | 12 | 12 | 12 | 12 | 12 | 12 | 12 |
| | Wax | | 1.5 | 1.5 | 1.5 | 1.5 | 1.5 | 1.5 | 1.5 | 1.5 |
| | Antioxidant 6PPD | | 3 | 3 | 3 | 3 | 3 | 3 | 3 | 3 |
| | Antioxidant TMQ | | 1 | 1 | 1 | 1 | 1 | 1 | 1 | 1 |
| | Stearic acid | | 3 | 3 | 3 | 3 | 3 | 3 | 3 | 3 |
| | Zinc oxide | | 2.5 | 2.5 | 2.5 | 2.5 | 2.5 | 2.5 | 2.5 | 2.5 |
| | Silane coupling agent (Si75) | | 6 | 6 | 6 | 6 | 6 | 6 | 6 | 6 |
| | 5% Oil-containing powder sulfur | | 1.5 | 1.5 | 1.5 | 1.5 | 1.5 | 1.5 | 1.5 | 1.5 |
| | Vulcanization accelerator TBBS | | 2 | 2 | 2 | 2 | 2 | 2 | 2 | 2 |
| | Vulcanization accelerator DPG | | 2 | 2 | 2 | 2 | 2 | 2 | 2 | 2 |
| Evaluation | E*(at 50° C.), Target: 8.8~20 | | 8.35 | 9.01 | 8.74 | 8.95 | 9.45 | 11.55 | 14.55 | 17.22 |
| | tan δ (at 50° C.), Target: <0.29 | | 0.255 | 0.268 | 0.258 | 0.251 | 0.254 | 0.261 | 0.264 | 0.285 |
| | (1) tan δ index, Target: >85 | | 100 | 95 | 99 | 102 | 100 | 98 | 96 | 88 |
| | (2) Steering response index, Target: >103 | | 100 | 102 | 101 | 104 | 110 | 120 | 130 | 135 |
| | (3) Abrasion resistance index Primary target: >65 Secondary target: >90 | | 100 | 87 | 88 | 100 | 98 | 94 | 82 | 70 |
| | Average of (1)-(3), Target: ≥98 | | 100 | 95 | 96 | 102 | 103 | 104 | 103 | 98 |
| | Average of (1) and (2), Target: ≥103 | | 100 | 98 | 100 | 103 | 105 | 109 | 113 | 112 |
| | Elongation at break EB (%), Target: ≥450 | | 515 | 415 | 445 | 515 | 505 | 495 | 490 | 450 |

(Viscoelasticity Test 2)

The complex modulus E* (MPa) and the loss tangent tan δ of the vulcanized rubber composition were measured under the same conditions as in the viscoelasticity test 1, except that the temperature was changed to 50° C. A larger value of E* indicates higher rigidity and higher handling stability. A smaller value of tan δ indicates less heat build-up and better fuel economy.

The measured values of tan δ were expressed as indices relative to the value of Comparative Example 14 taken as 100. A larger index value indicates better fuel economy.

(Steering Response)

The test tire was mounted on all the wheels of a vehicle (Vitz made by Toyota Motor Corporation). Then a test driver drove the vehicle on a test course where bar-like protrusions were provided on the road surface and where circuit, zigzag and circumference roads were installed, and then the driver As shown in Table 5, in Examples using MB obtained by mixing rubber latex, specific microfibrillated plant fibers and a predetermined amount of a cationic polymer, the steering response, fuel economy, and abrasion resistance were improved in a balanced manner compared with Comparative Example 14.

In Comparative Examples 15 and 16 in which no cationic polymer was used in the preparation of a masterbatch, although coagulation of the masterbatch could be achieved, the microfibrillated plant fibers were insufficiently milled and therefore the microfibrillated plant fibers could not be sufficiently dispersed in the rubber composition, which resulted in greatly poor abrasion resistance and the other performance properties equal or inferior to those of Comparative Example 14.

In Examples 30 and 31, the abrasion resistance indices were less than the secondary target, but the other performance properties (particularly, handling stability) were good. Therefore, the formulations of Examples 29 and 30 are suitable in applications not requiring abrasion resistance, such as tires for two-wheel vehicles and racing tires.

Reference Signs List

1: Inner sidewall layer
2: Outer sidewall layer
3: Strip apex

The invention claimed is:

1. A rubber composition, prepared from a masterbatch obtained by mixing
   rubber latex,
   microfibrillated plant fibers produced by treating a natural product for the microfibrillated plant fibers with sodium hydroxide and then mechanically grinding or beating the sodium hydroxide-treated fibers., and
   a cationic polymer,
   wherein 0.01 to 5 parts by mass of the cationic polymer is added per 100 parts by mass of a rubber component of the rubber latex.

2. The rubber composition according to claim 1, wherein the rubber composition comprises at least one diene rubber selected from the group including natural rubber, isoprene rubber, epoxidized natural rubber, butadiene rubber, and styrene butadiene rubber.

3. The rubber composition according to claim 1, wherein the rubber composition comprises 0.1 to 20 parts by mass of the microfibrillated plant fibers per 100 parts by mass of the total rubber component of the rubber composition.

4. The rubber composition according to claim 1, wherein the masterbatch comprises 5 to 30 parts by mass of the microfibrillated plant fibers per 100 parts by mass of a rubber component of the rubber latex.

5. A sidewall, an inner sidewall layer, a breaker cushion, a base tread, a tie gum, a bead apex, or a strip apex, formed from the rubber composition according to claim 1.

6. The sidewall, inner sidewall layer, breaker cushion, base tread, tie gum, bead apex, or strip apex according to claim 5, wherein a rubber strip obtained from at least one tire component selected from the group consisting of the sidewall, the inner sidewall layer, the breaker cushion, the base tread, the tie gum, the bead apex, and the strip apex has a ratio (E*a/*b) of a complex modulus E*a in an extrusion direction to a complex modulus E*b in a direction perpendicular to the extrusion direction, measured at a temperature of 70° C. and a dynamic strain of 2%, of 1.05 to 6.00, with the E*a being 7 to 100 MPa.

7. A tread formed from the rubber composition according to claim 1.

8. A pneumatic tire, formed from the rubber composition according to claim 1.

* * * * *